United States Patent
Nagao

(10) Patent No.: US 12,323,566 B2
(45) Date of Patent: Jun. 3, 2025

(54) IMAGE PROCESSING DEVICE, OUTPUT SYSTEM, AND OUTPUT METHOD

(71) Applicant: SHARP KABUSHIKI KAISHA, Sakai (JP)

(72) Inventor: Tsuyoshi Nagao, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/669,295

(22) Filed: May 20, 2024

(65) Prior Publication Data

US 2024/0314254 A1 Sep. 19, 2024

Related U.S. Application Data

(63) Continuation of application No. 18/114,224, filed on Feb. 25, 2023, now Pat. No. 12,022,046.

(30) Foreign Application Priority Data

Mar. 7, 2022 (JP) ................ 2022-034649

(51) Int. Cl.
*G06F 15/00* (2006.01)
*H04N 1/00* (2006.01)
*H04N 1/44* (2006.01)

(52) U.S. Cl.
CPC ....... *H04N 1/4433* (2013.01); *H04N 1/00204* (2013.01); *H04N 1/00408* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| 9,760,330 B2 | 9/2017 | Kuroyanagi et al. |
| 2004/0046973 A1 | 3/2004 | Sugahara et al. |

(Continued)

FOREIGN PATENT DOCUMENTS

| JP | 2013-025809 A | 2/2013 |
| JP | 2016-173761 A | 9/2016 |

(Continued)

OTHER PUBLICATIONS

Non-Final Office Action issued on Aug. 30, 2023 for U.S. Appl. No. 18/114,224.

(Continued)

*Primary Examiner* — Mark R Milia
(74) *Attorney, Agent, or Firm* — ScienBiziP, P.C.

(57) ABSTRACT

An image processing device including: a controller; a device information generator that generates device information including identification information of a device; and a job executor that is capable of executing a job with predetermined setting on the basis of an external command transmitted from a terminal device, wherein the controller displays the generated device information on the terminal device, and is capable of outputting the job with predetermined setting by controlling the job executor on the basis of the external command transmitted from the terminal device that has read the displayed device information, and the controller determines propriety of display of the device information according to setting of propriety of external command operation for a user who is authenticated as an authenticated user in an operation mode requiring user authentication.

6 Claims, 30 Drawing Sheets

(56) References Cited

U.S. PATENT DOCUMENTS

| | | |
|---|---|---|
| 2013/0021643 A1 | 1/2013 | Nuggehalli et al. |
| 2014/0185089 A1 | 7/2014 | Nuggehalli et al. |
| 2016/0274842 A1 | 9/2016 | Kuroyanagi et al. |
| 2017/0024173 A1 | 1/2017 | Iwamoto |

FOREIGN PATENT DOCUMENTS

| | | |
|---|---|---|
| JP | 2017-202669 A | 11/2017 |
| JP | 2021-086410 A | 6/2021 |

OTHER PUBLICATIONS

Notice of Allowance and Fees Due issued on Feb. 23, 2024 for U.S. Appl. No. 18/114,224.

FIG. 3

| | DEVICE INFORMATION ITEM (KEY) | VALUE |
|---|---|---|
| I/F-RELATED ITEM | NAME | "Remote Operation" |
| | TYPE | "MFP" |
| | VERSION | "1.0" |
| MULTIFUNCTION PERIPHERAL-RELATED ITEM | COLOR MODE | "Color output possible" |
| | TRANSMISSION DESTINATION | "testtest@bbb.co.jp" |
| | SETTING OF READING | "One side" |
| | IMAGE ORIENTATION | "Upward" |
| | ⋮ | ⋮ |
| CONNECTION-RELATED ITEM | DEVICE ID | "jv8Ou3QBGv8w6yNtGt" |
| | SESSION KEY | "1qazxsw23edcvfr45tgbnhy67ujm, ki8 ----" |
| | INSTALLATION COUNTRY | "0 -11" (example; value 3: JAPAN ) |
| | ⋮ | ⋮ |

FIG. 5A

| CONNECTION INFORMATION | SETTING INFORMATION |
|---|---|
| DEVICE ID "jv6Ou3QBGv8w6yNtGt" SESSION KEY "1qazxsw23edcvfr45tgbn hy67ujm, ki8 ----" | MODE: SCAN TRANSMISSION DESTINATION: testtest@bbb.co.jp SETTING OF READING: SINGLE SIDE IMAGE ORIENTATION: UPWARD COLOR MODE: AUTOMATIC |

FIG. 5B

| AUTHENTICATION INFORMATION | | |
|---|---|---|
| USER ID | PASSWORD | USER NAME |
| "0001" | "*****" | "AI UEO" |

FIG. 9A

| ID | PASSWORD | USER NAME |
|---|---|---|
| 0001 | ***** | AI UEO |
| 0002 | ***** | KAKI KUKEKO |
| 0003 | ***** | TACHI TSUTETO |
| 0004 | ***** | NANI NUNENO |

FIG. 9B

| ID | PASSWORD | USER NAME | COMMAND RECEPTION YES/NO |
|---|---|---|---|
| 0001 | ***** | AI UEO | YES |
| 0002 | ***** | KAKI KUKEKO | YES |
| 0003 | ***** | TACHI TSUTETO | NO |
| 0004 | ***** | NANI NUNENO | NO |

FIG. 9C

| ID | PASSWORD | USER NAME | PORT PORT NO./NO |
|---|---|---|---|
| 0001 | ***** | AI UEO | PORT NO. 1 |
| 0002 | ***** | KAKI KUKEKO | PORT NO. 3 |
| 0003 | ***** | TACHI TSUTETO | NO |
| 0004 | ***** | NANI NUNENO | NO |

FIG. 9D

| ID | PASSWORD | USER NAME | DEVICE INFORMATION ON/OFF |
|---|---|---|---|
| 0001 | ***** | AI UEO | ON |
| 0002 | ***** | KAKI KUKEKO | OFF |
| 0003 | ***** | TACHI TSUTETO | OFF |
| 0004 | ***** | NANI NUNENO | OFF |

FIG. 22

| ID | PASSWORD | USER NAME | DEVICE INFORMATION TYPE A ※1 |
|---|---|---|---|
| 0001 | ＊＊＊＊ | AI UEO | 1 |
| 0002 | ＊＊＊＊ | KAKI KUKEKO | 1 |
| 0003 | ＊＊＊＊ | TACHI TSUTETO | 2 |
| 0004 | ＊＊＊＊ | NANI NUNENO | 3 |

※1

1: USER WHO IS ALLOWED TO OPERATE DEVICE FROM BODY WHEN DEVICE INFORMATION IS DISPLAYED AND DISPLAY OF DEVICE INFORMATION IS CANCELED

2: USER WHO IS NOT ALLOWED TO DISPLAY DEVICE INFORMATION AND IS ONLY ALLOWED TO OPERATE DEVICE FROM BODY

3: USER WHO CAN OPERATE ONLY FROM DISPLAYED DEVICE INFORMATION

FIG. 25A

| ID | PASSWORD | USER NAME | DEVICE INFORMATION TYPE B |
|---|---|---|---|
| 0001 | ***** | AI UEO | ON |
| 0002 | ***** | KAKI KUKEKO | ON |
| 0003 | ***** | TACHI TSUTETO | OFF |
| 0004 | ***** | NANI NUNENO | EXT※2 |

※2
ACQUIRE DISPLAY PROPRIETY DETERMINATION INFORMATION OF DEVICE INFORMATION FROM TERMINAL DEVICE

FIG. 25B

| DISPLAY PROPRIETY DETERMINATION INFORMATION | | |
|---|---|---|
| USER ID "0004" | PASSWORD "*****" | USER NAME "NANI NUNENO" |
| DEVICE INFORMATION DISPLAY ON/OFF: ON | | |

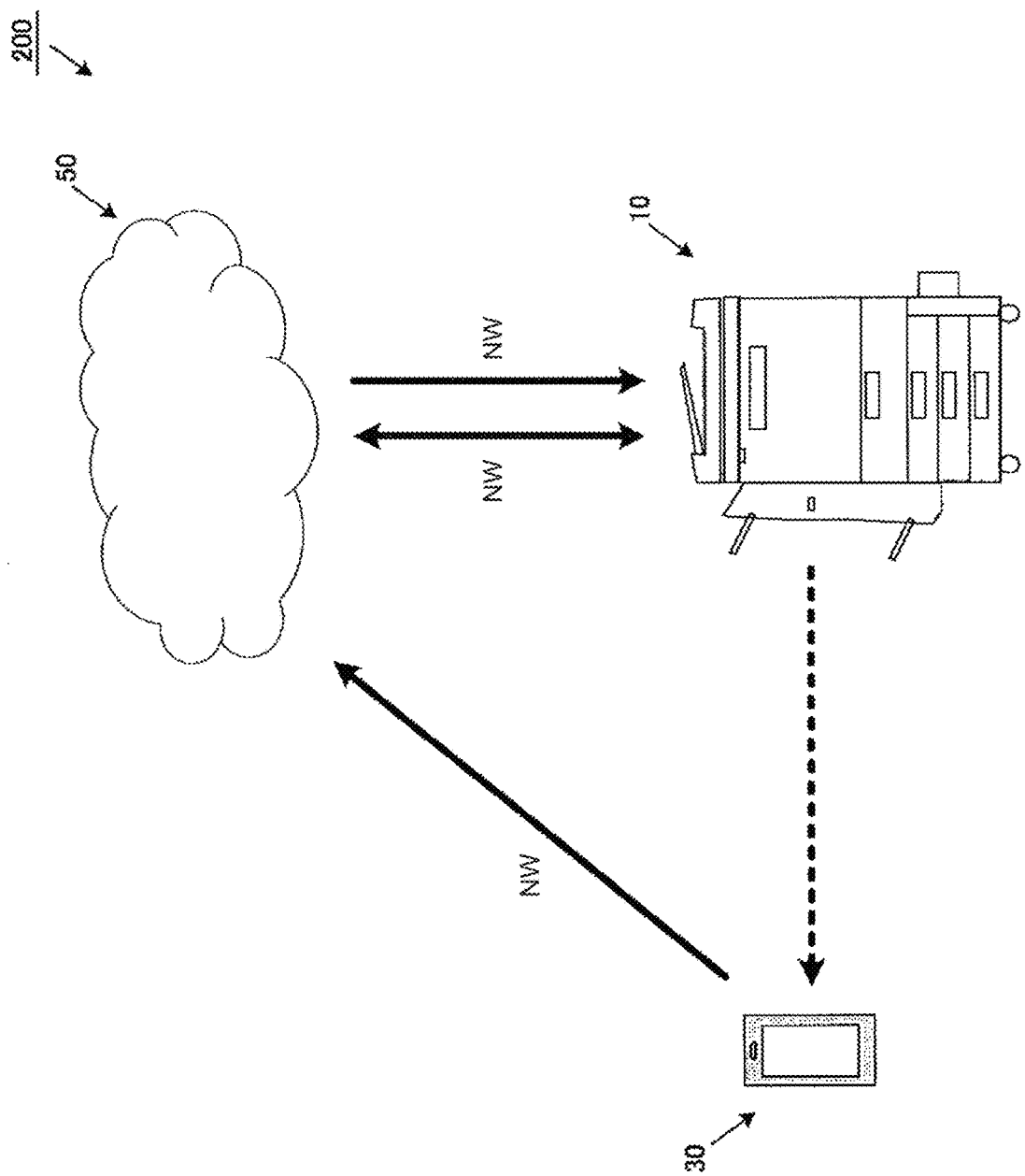

IMAGE PROCESSING DEVICE, OUTPUT SYSTEM, AND OUTPUT METHOD

CROSS-REFERENCE TO RELATED APPLICATIONS

This application is a continuation of U.S. patent application Ser. No. 18/114,224, filed on Feb. 25, 2023, which claims priority based on JP 2022-034649 filed in Japan on Mar. 7, 2022, the entire contents of the above-identified application are hereby incorporated by reference.

BACKGROUND OF THE INVENTION

Field of the Invention

The present disclosure relates to an image processing device and the like.

Description of the Background Art

For example, a multifunction peripheral capable of realizing, in a single apparatus, a plurality of modes, such as a copy mode, a scan mode, and a fax mode, often includes an operation screen for selecting a mode and receiving input and selection of a setting value for the selected mode.

Recently, it has been a primary trend to adopt, as an operation screen, a touch panel display including a display for displaying various types of information to a user and a touch panel that is disposed on the display in a superimposed manner to detect a position touched by a user's finger. The user can easily and intuitively select a mode or input and select a setting value for the selected mode by operating the touch panel while checking the various types of information displayed on the display.

It is effective to avoid high frequency contact with unspecified persons in order to reduce a risk of various infectious diseases.

For example, operation via an operation screen of a shared multifunction peripheral in a workplace, a multipurpose multifunction peripheral installed in a convenience store or the like, is no exception, and there is a need for urgent measures to avoid high frequency contact.

As an example for avoiding direct contact with the operation screen of a multifunction peripheral or other device, for example, in prior art, a method for creating a document job without manually inputting information into a document processing device such as a multifunction peripheral is known.

The document processing device according to the prior art at least establishes a communication link with the document processing device and displays encoded data including network interface data for transmitting job identifiers to the document processing device on its own operation panel. Then, a mobile device that acquires the encoded data using various methods establishes a communication link with the document processing device by using this network interface data and causes the document processing device to execute a document job associated with the job identifiers.

In the prior art, an encoded data display for displaying the encoded data along with a job setting buttons, graphical user interface, and the like is provided on the operation panel such that acquisition of encoded data by the mobile device is enabled. However, as in the encoded data display according to the prior art, when device information such as encoded data is displayed on the operation panel constantly or each time the job setting button or the like is used, it may be troublesome for a user who does not use the device information, and it is not necessarily excellent in terms of operability.

An object of the present disclosure is to provide an excellent operable image processing device or the like which achieves reduction of trouble according to display of device information by determining propriety of display of device information on the basis of setting applied to each user.

SUMMARY OF THE INVENTION

In order to solve the above problem, an image processing device according to the present disclosure includes: a controller; a device information generator that generates device information including identification information of a device; and a job executor that is capable of executing a job with predetermined setting on the basis of an external command transmitted from a terminal device, wherein the controller displays the generated device information on the terminal device, and is capable of outputting the job with predetermined setting by controlling the job executor on the basis of the external command transmitted from the terminal device that has read the displayed device information, and the controller determines propriety of display of the device information according to setting of propriety of external command operation for a user who is authenticated as an authenticated user in an operation mode requiring user authentication.

In addition, an image processing device according to the present disclosure includes: a controller; a device information generator that generates device information including identification information of a device; and a job executor that is capable of executing a job with predetermined setting on the basis of an external command transmitted from a terminal device, wherein the controller displays the generated device information on the terminal device, and is capable of outputting the job with predetermined setting by controlling the job executor on the basis of the external command transmitted from the terminal device that has read the displayed device information, the controller determines propriety of display of the device information on the basis of user information set for each user in an operation mode requiring user authentication, and the user information includes information related to operation authority to the image processing device.

Furthermore, an image processing device according to the present disclosure includes: a controller; a device information generator that generates device information including identification information of a device; and a job executor that is capable of executing a job with predetermined setting on the basis of an external command transmitted from a terminal device, wherein the controller displays the generated device information on the terminal device, and is capable of outputting the job with predetermined setting by controlling the job executor on the basis of the external command transmitted from the terminal device that has read the displayed device information, the controller determines propriety of display of the device information on the basis of user information set for each user in an operation mode requiring user authentication, and the user information includes information for determining propriety of display of the device information acquired from the terminal device.

An output system according to the present disclosure is an output system including: a terminal device; and an image processing device, wherein the terminal device includes: a controller; a device information acquirer that acquires device information including identification information for identifying the image processing device, the controller generates a user interface that receives operation setting of the image processing device on the basis of a request by a user, and transmits, as a command, the operation setting received via the user interface, the image processing device includes: a controller; a device information generator that generates the device information including the identification information of a device; and a job executor that is capable of executing a job with predetermined setting on the basis of the command, the controller displays the generated device information on the terminal device, and is capable of outputting the job with predetermined setting by controlling the job executor on the basis of the command transmitted from the terminal device that has read the displayed device information, and the controller determines propriety of display of the device information according to an authentication result of a user in an operation mode requiring user authentication.

An output method according to the present disclosure includes: generating device information including identification information of a device; displaying the generated device information on the terminal device, and being capable of outputting the job with predetermined setting on the basis of an external command transmitted from the terminal device that has read the displayed device information; and determining propriety of display of the device information according to an authentication result of a user in an operation mode requiring user authentication.

According to the present disclosure, it is possible to provide an excellent operable image processing device or the like which achieves reduction of trouble according to display of device information by determining propriety of display of device information on the basis of setting applied to each user.

BRIEF DESCRIPTION OF THE DRAWINGS

FIG. 3 is a table illustrating a configuration example of device information.

FIG. 5A is a diagram illustrating a configuration example of setting information. FIG. 5B is a diagram illustrating a configuration example of authentication information.

FIG. 9A is a diagram illustrating a data configuration example of an authentication information table. FIG. 9B is a diagram illustrating a data configuration example of a command reception setting table. FIG. 9C is a diagram illustrating a data configuration example of a port use setting table. FIG. 9D is a diagram illustrating a data configuration example of user information table.

FIG. 22 is a diagram illustrating a data configuration example of a user information table.

FIG. 25A is a diagram illustrating a data configuration example of a user information table. FIG. 25B is a diagram illustrating a data configuration example of display ON/OFF information of device information.

FIG. 27 is a diagram schematically illustrating an overall configuration of an output system according to a fourth embodiment.

DESCRIPTION OF THE PREFERRED EMBODIMENTS

Embodiments of the present disclosure will be described hereinafter with reference to the accompanying drawings. In the present disclosure, a multifunction peripheral 10 capable of executing jobs associated with a copy mode, a scan mode, a fax mode, and the like will be described as an example of an image processing device. The following embodiments are examples for describing the present disclosure, and the technical scope of the description in the claims is not limited to the following description.

1 First Embodiment

Figure 1:
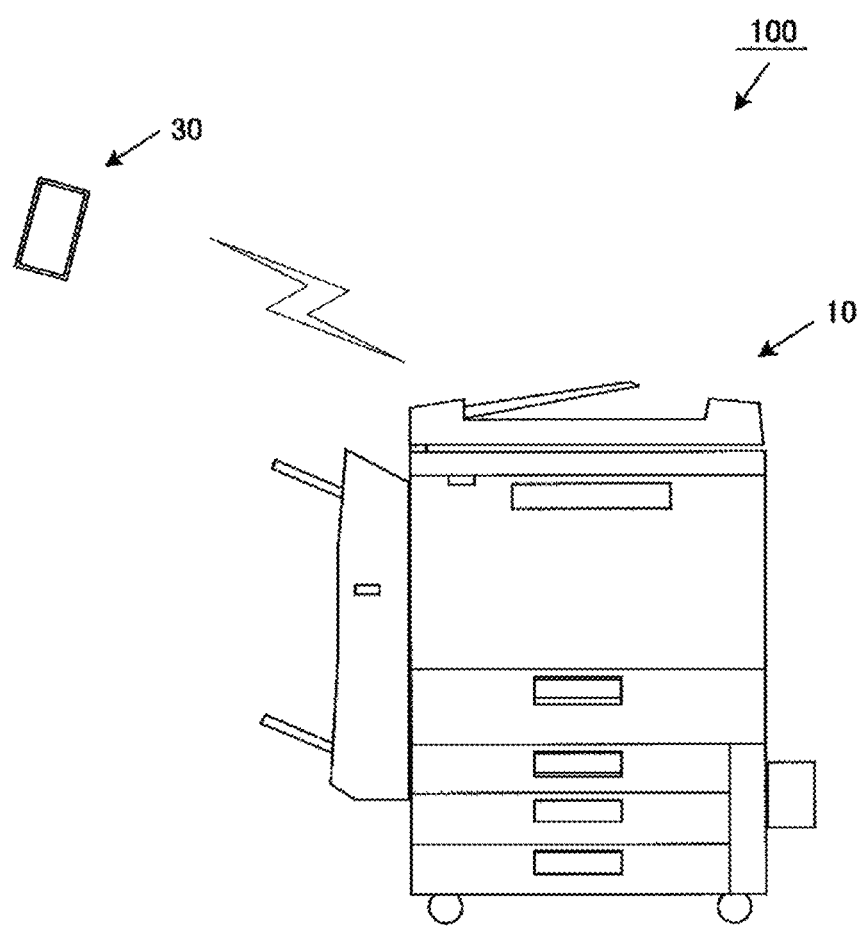
FIG. 1 is a diagram schematically illustrating an overall configuration of an output system according to a first embodiment.

FIG. 1 is a diagram schematically illustrating an overall configuration of an output system 100 according to a first embodiment. The output system 100 includes a multifunction peripheral 10 serving as an image processing device and a terminal device 30. In the output system 100 according to the first embodiment, an external authentication server that authenticates a user to the multifunction peripheral 10 can be separately provided.

1.1 Functional Configuration
1.1.1 Multifunction Peripheral 10

Figure 2:
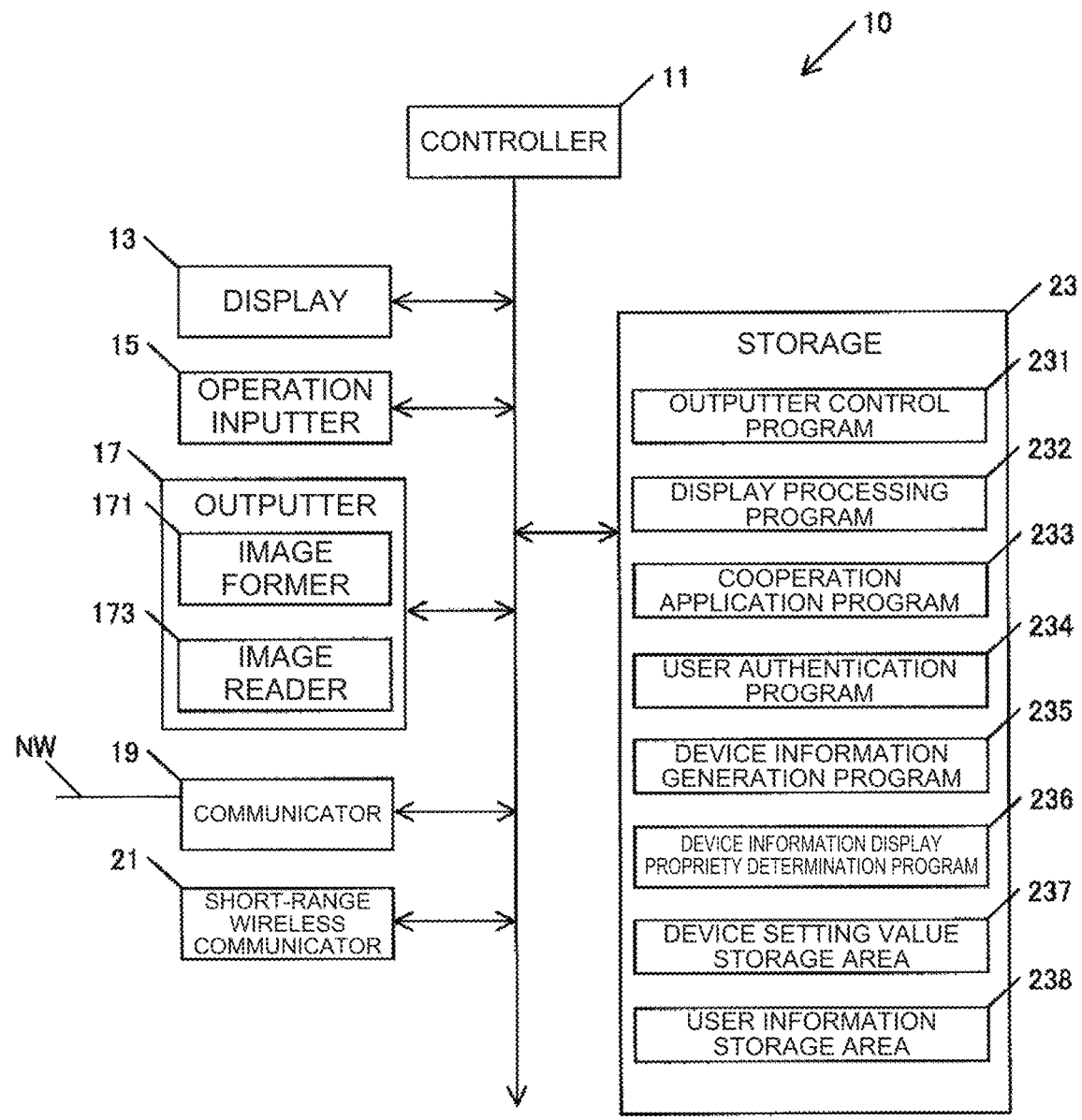
FIG. 2 is a diagram illustrating a functional configuration of a multifunction peripheral according to the first embodiment.

FIG. 2 is a diagram illustrating a functional configuration of the multifunction peripheral 10. The multifunction peripheral 10 includes a controller 11, a display 13, an operation inputter 15, an outputter 17, a communicator 19, a short-range wireless communicator 21, and a storage 23.

The controller 11 controls the overall multifunction peripheral 10. The controller 11 is composed of, for example, one or more arithmetic devices (such as a central processing units (CPUs)). The controller 11 reads and executes various programs stored in the storage 23, so that functions thereof is implemented.

The display 13 displays various types of information to a user or the like. The display 13 may be configured from, for example, a liquid crystal display (LCD) or an organic electro-luminescence (EL) display. The display 13 displays device information as described below.

The operation inputter 15 receives input of information performed by the user or the like. The operation inputter 15 can be composed of a hardware key (for example, a numeric keypad), a button, and the like The operation inputter 15 may be configured as a touch panel display that allows input via the display 13. In this case, examples of a method of input to the touch panel display may include a resistive method, an infrared method, an inductive method, and a capacitive method.

The outputter 17 includes an image former 171 and an image reader 173. The image former 171 forms and outputs an image based on image data (scan data generated by scanning a printed document or electronic data input from an external device, a portable storage medium, or other external source) on paper as a recording medium. The image former 171 may include, for example, a laser printer using an electrophotographic system. In this case, the image former 171 forms an image by using toners supplied from toner cartridges (not illustrated) corresponding to toner colors (e.g., cyan, magenta, yellow, and black).

The image reader 173 generates scan data by scanning the printed document to be read and outputs electronic data in a predetermined format (e.g., PDF (portable document format)) on the basis of the scan data. The image reader 173 may be configured as a scanner device including an image sensor such as a charge coupled device (CCD) and a contact image sensor (CIS). The image reader 173 is not limited in its configuration as long as the image reader 173 can output scan data (electronic data) by reading a reflected light image from the printed document with an image sensor.

The communicator 19 includes either or both wired and wireless interfaces for communication with other device via a LAN (Local area network), a WAN (Wide area network), the Internet, a telephone line, a fax line, or the like, for example.

The short-range wireless communicator 21 communicates with other device such as the terminal device 30 via a short-range wireless communication protocol such as Wi-Fi (registered trademark), Bluetooth (registered trademark), infrared, Near field communication (NFC), and RFID (Radio frequency identification), and acquires authentication information, an external command, or the like, described below. In a case where the authentication information is obtained from an IC (Integrated circuit) card or an ID (Identity/Identification Card) card such as a magnetic card, a card reader capable of obtaining such card information can be included in the short-range wireless communicator 21. Some of the functions of the short-range wireless communicator 21 can be performed by the communicator 19.

The storage 23 stores various types of data and various programs required for operation of the multifunction peripheral 10.

The storage 23 may be formed of, for example, a storage device such as a random access memory (RAM), a hard disk drive (HDD), a solid state drive (SSD), and a read only memory (ROM).

In the first embodiment, the storage 23 stores an outputter control program 231, a display processing program 232, a cooperation application program 233, a user authentication program 234, a device information generation program 235, and a device information display propriety determination program 236, and ensures a device setting value storage area 237, and a user information storage area 238.

The outputter control program 231 is a program that is read by the controller 11 when the outputter 17 is controlled. The controller 11 that has read the outputter control program 231 controls the outputter 17 and executes a job by printing output by the image former 171 and electronic data output by the image reader 173.

The display processing program 232 is, for example, a program read by the controller 11 when display of a home screen (described below) and a setting screen based on each operation mode on the display 13 is controlled. The controller 11 that has read the display processing program 232 displays a display screen including device information on the display 13 at any timing of device startup, sleep mode recovery, auto clear, or user authentication when authentication mode is enabled. The auto clear in the present disclosure is a process that is executed when the job itself is cancelled or when the input or selection of a setting value pertaining to job execution is cancelled. Generally, auto clear can be executed by selection of an "auto clear button" provided on the display screen. The controller 11 that has read the display processing program 232 restricts display of device information on the display screen in a case where setting applied to an authenticated user meets a predetermined condition. The control of the display of the device information on the display screen will be described below.

The cooperation application program 233 is a program that is read by the controller 11 when cooperation with the terminal device 30 is started. The controller 11 reads the cooperation application program 233 to receive a command including setting information and the like (hereinafter sometimes referred to as an external command) transmitted from the terminal device 30.

Herein, the "cooperation" denotes that at least two devices work together while sharing information in order to obtain a single result. In the first embodiment, the setting information pertaining to job execution set by the terminal device 30 is transmitted as the external command to the multifunction peripheral 10. The multifunction peripheral 10 can share setting information pertaining to job execution with the terminal device 30 by acquiring the setting information.

In order for the multifunction peripheral 10 and the terminal device 30 to cooperate, connection must be established between the multifunction peripheral 10 and the terminal device 30 to communicate in both directions. The connection established between the multifunction peripheral 10 and the terminal device 30 may be limited to connection only during operation of the cooperation application program 233, or may be always maintained while the devices are in operation. Furthermore, the connection may be established only when necessary communication is performed.

The user authentication program 234 is a program that is read by the controller 11 when a user who logs into the multifunction peripheral 10 is authenticated. In a case where the authentication function is on, the controller 11 that has read the user authentication program 234 authenticates the user who logs into the device on the basis of the authentication information received for input via a login screen described below. In addition to knowledge authentication such as combination of a login user name and a login password of a user attempting to log in to the device, the user authentication can also be performed by biometric authentication using the terminal device 30 such as a cell phone, a smart phone, and a tablet, possession authentication using an ID card such as an IC card and a magnetic card, face recognition, and fingerprint recognition.

The device information generation program 235 is a program read by the controller 11 when the device information including the identification information of the multifunction peripheral 10 is generated. The device information pertaining to the present disclosure includes, at least, items related to the setting of the multifunction peripheral 10 required for inputting setting information at the terminal device 30, as well as items related to the connection such as identification information of the multifunction peripheral 10 and session keys. The controller 11 that has read the device information generation program 235 generates this information as encoded information and characters (such as numbers, English letters, kana, hiragana, kanji, symbols). Examples of the encoded information include a one-dimensional code such as a bar code (e.g., an EAN code, a JAN code, Codbar, CODE 128), or a two-dimensional code. Examples of the two-dimensional code include a stacked two-dimensional code (e.g., PDF 417 or CODE 49), or a matrix two-dimensional code (e.g., a quick response code (QR Code (registered trademark)), Data Matrix, Veri Code, or Aztec). In the following description, a quick response code (QR code (registered trademark)) is used as an example of the device information.

The controller 11 updates the device information on a regular or irregular basis. For example, the controller 11 may update a driver program for the multifunction peripheral 10, and updates the device information in order to correspond to an added new function. For example, the device information may also be updated when information related to connection such as a network address (IP address) or the like is updated or changed with change in the device installation location.

Herein, a configuration example of the device information will be described with reference to FIG. 3. The device information illustrated in FIG. 3 includes "name", "type", and "version" as interface (I/F)-related item, "color mode", "transmission destination", "setting of reading", "image orientation", and the like as multifunction peripheral-related item, and "device ID", "session key", "installation country", and the like as connection-related item, all items of which are described in specific formats. The terminal device 30 may read and decode the encoded device information to acquire the device information of the multifunction peripheral 10. The terminal device 30 can be connected to the multifunction peripheral 10 on the basis of the acquired device information.

The device information items and the values thereof illustrated in FIG. 3 are only examples, and the device information according to the present disclosure is not limited to the illustration in FIG. 3. For example, a personal identification number (PIN) or a one-time password generated by a token may be included in the device information to establish secure connection.

The device information display propriety determination program 236 is a program read by the controller 11 when whether or not the device information should be displayed on the display screen is determined. The controller 11 that has read the device information display propriety determination program 236 determines the display propriety of the device information in accordance with the setting for the authenticated user. The determination as to the display propriety of the device information will be described later.

The device setting value storage area 237 is a storage area where device setting values pertaining to generation of the device information are stored. The controller 11 that has read the device information generation program 235 generates the device information by reading the device setting values (e.g., setting values related to "color mode", "transmission destination", "read setting", "image orientation", and the like) stored in the device setting value storage area 237.

The user information storage area 238 is a storage area where authentication information for user authentication and a table related to setting applied to authenticated users (e.g., user information, a command reception setting table, and the like, as described below) are stored. For example, in a form in which the user authentication is performed by inputting the combination of a login user name and a login password on a login screen, the user information storage area 238 stores the combination of the login user name and the login password of the login user to be authenticated as the authenticated user. The table stored by the user information storage area 238 is information in which the controller 11 refers to when the display propriety of the device information is determined, and is, for example, information in which ON/OFF of the display of the device information is set for each authenticated user.

1.1.2 Terminal Device 30

The terminal device 30 according to the present disclosure may be configured as, for example, a mobile terminal device such as a smartphone, a tablet, a cell phone, and a notebook computer. The terminal device 30 is configured as a device that has combination of at least a function of providing a (graphical) user interface, a communication function, and a function unique to a mobile terminal device.

Figure 4:
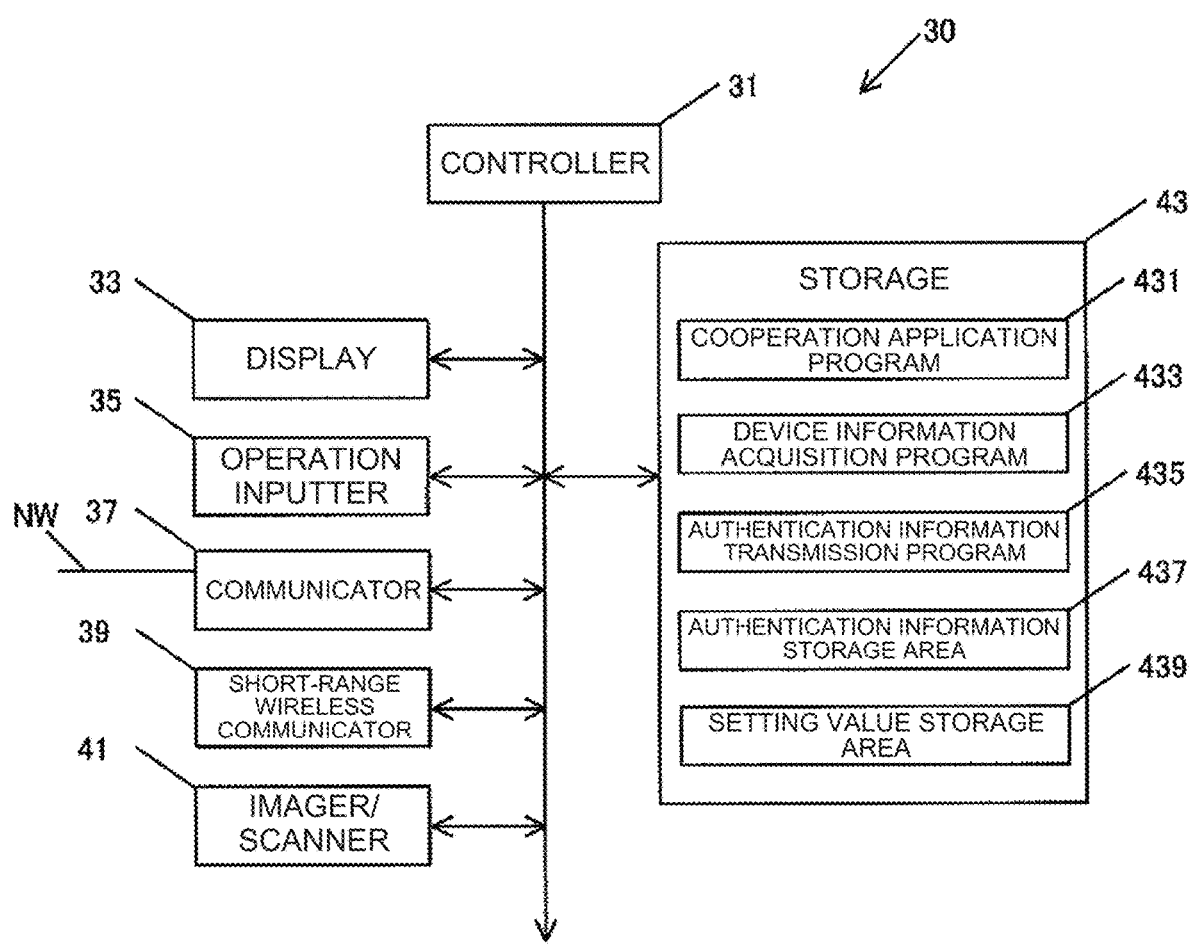
FIG. 4 is a diagram illustrating a functional configuration of a terminal device according to the first embodiment.

FIG. 4 is a functional configuration diagram of the terminal device 30. The terminal device 30 includes a controller 31, a display 33, an operation inputter 35, a communicator 37, a short-range wireless communicator 39, an imager/scanner 41, and a storage 43.

The controller 31 controls the overall terminal device 30. The controller 31 is composed of, for example, one or more arithmetic devices (such as CPUs), and the controller 31 reads and executes various programs stored in the storage 43 to perform functions thereof.

The display 33 displays various types of information to a user or the like. The display 33 may be constituted by, for example, an LCD, an organic EL display or the like. The display 33 can display, for example, an application screen as a reception screen for receiving job setting on the basis of display control by the controller 11 that has read a cooperation application program 431.

The operation inputter 35 receives input of information performed by the user or the like. The operation inputter 35 may be configured as a touch panel display that enables input via the display 33. In this case, examples of a method of input to the touch panel display may include a resistive method, an infrared method, an inductive method, and a capacitive method.

The communicator 37 includes either or both wired and wireless interfaces for communication with other device via a LAN, a WAN, the Internet, a telephone line, or the like.

As long as the short-range wireless communicator 39 can use short-range wireless communication protocols such as Wi-Fi (registered trademark), Bluetooth (registered trademark), infrared, NFC, RFID, or the like, for example, and can transmit authentication information, a command, or the like by communicating with other devices such as the multifunction peripheral 10, there are no restrictions on the configuration of the short-range wireless communicator 39. Some of the functions of the short-range wireless communicator 39 can be performed by the communicator 37.

Examples of the imager/scanner 41 include an imaging device such as a camera, and a scanning device using a laser beam. In a case where the multifunction peripheral 10 displays device information on the basis of control by the controller 31 that has read a device information acquisition program 433, the imager/scanner 41 acquires the device information. There are no restrictions on the configuration of the imager/scanner 41 as long as the imager/scanner is capable of acquiring the device information for the multifunction peripheral 10. In a case where the configuration is a configuration of providing device information in the form of electronic data, the device information can also be acquired via the short-range wireless communicator 39.

The storage 43 stores various programs and various types of data required for operation of the terminal device 30. The storage 43 may be composed of a storage device such as a RAM, an HDD, an SSD, and a ROM.

In the first embodiment, the storage 43 stores the cooperation application program 431, the device information acquisition program 433, and an authentication information transmission program 435, and ensures an authentication information storage area 437, and a setting value storage area 439.

The cooperation application program 431 is a program that is read by the controller 31 when cooperation with the multifunction peripheral 10 is started. The controller 31 can generate an application screen that receives setting for a job to be executed by the multifunction peripheral 10 and output an instruction to execute a job to the multifunction peripheral 10 by reading the cooperation application program 431.

The controller 31 that has read the cooperation application program 431 generates setting information used for job execution on the basis of various setting values inputted and selected via the generated application screen. Then, the controller 31 transmits the generated setting information as an external command to the multifunction peripheral 10 by using the necessary connection information included in the device information acquired from the multifunction peripheral 10.

Herein, FIG. 5A is a diagram illustrating a configuration example of the setting information to be transmitted as the external command by the controller 31. FIG. 5A illustrates setting items including a group of "mode", "transmission destination", "reading setting", "image orientation", "color mode" that are inputted and selected via the application screen or other means, as a configuration example of the setting information. The controller 31 transmits these setting information as the external command to the multifunction peripheral 10 on the basis of the device ID: "jv6Ou3QBGv8w6yNtGt", session key: "1qazxsw23edcvfr45tgbnhy67ujm,ki8---" and other connection information acquired from the device information of the multifunction peripheral 10.

The device information acquisition program 433 is a program read by the controller 31 when the device information is acquired from the multifunction peripheral 10. The controller 31 that has read the device information acquisition program 433 acquires the device information from the multifunction peripheral 10 by controlling the imager/operation acceptor 41 and the short-range wireless communicator 39.

The authentication information transmission program 435 is a program that is read by the controller 31 when a user logs into the multifunction peripheral 10 via the terminal device 30. When a user who uses the terminal device 30 attempts to log in to the multifunction peripheral 10 without going through the login screen provided by the multifunction peripheral 10, for example, the controller 31 that has read the authentication information transmission program 435 transmits the authentication information illustrated in FIG. 5B to the multifunction peripheral 10. FIG. 5B is an example that includes user ID "0001", password "*****", and user name "Ai Ueo" as authentication information. The authentication information can be transmitted via the short-range wireless communicator 39 or the communicator 37.

The authentication information storage area 437 is a storage area where the authentication information to be transmitted to the multifunction peripheral 10 is stored.

The setting value storage area 439 is a storage area where a setting value pertaining to execution of a job is stored. The setting value stored in the setting value storage area 439 may be read out as appropriate when the controller 31 generates the setting information.

1.2 Flow of Process 1.2.1 Overall Process

Figure 6:
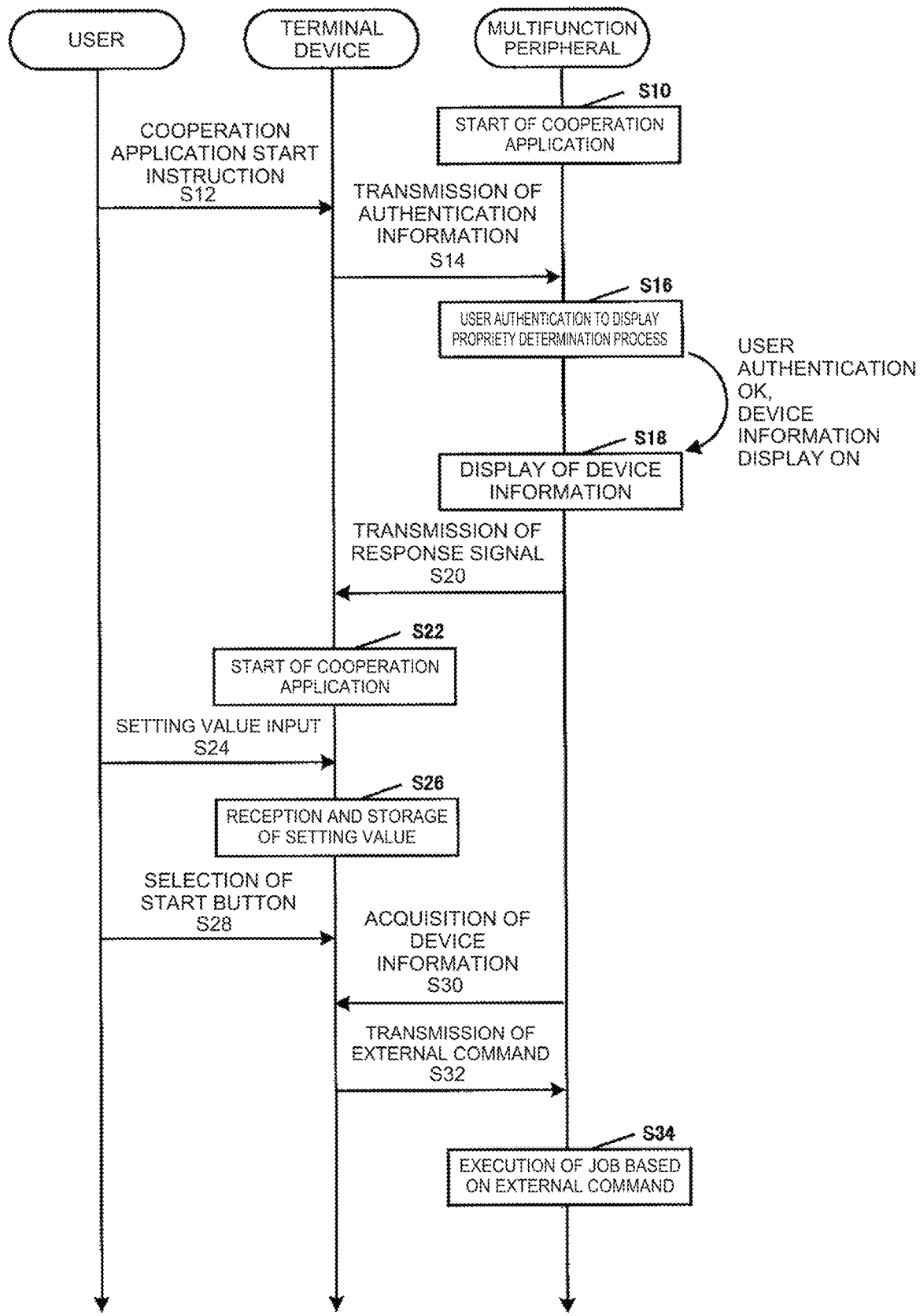
FIG. 6 is a flowchart illustrating an overall process according to the first embodiment.

Now, an overall process according to the first embodiment will be described with reference to a flowchart in FIG. 6.

First, the multifunction peripheral 10 starts cooperation application on the basis of an activation instruction issued by a user (Step S10). The cooperation application of the multifunction peripheral 10 is not limited to input of a startup instruction by the user, but can also be automatically started, for example, at the time of device startup, recovery from a sleep mode, or auto-clear.

The user inputs a startup instruction of the cooperation application by operating the terminal device 30 (Step S12).

For example, in a case where user authentication is required in the operation of the cooperation application in the multifunction peripheral 10, the terminal device 30 transmits authentication information to the multifunction peripheral 10 (Step S14).

When the authentication information is received, the multifunction peripheral 10 performs the user authentication to a device information display propriety determination process (Step S16). Details of the process pertaining to Step S16 will be described below.

In a case where the user authentication is successful and the display of device information is enabled, the multifunction peripheral 10 displays the device information (Step S18). Then, the multifunction peripheral 10 transmits, to the terminal device 30, a response signal indicating that the user authentication is successful (Step S20).

Upon receipt of the response signal from the multifunction peripheral 10, the terminal device 30 starts the cooperation application (Step S22).

The user inputs various setting values required to execute a job via the application screen provided by the cooperation application of the terminal device 30 (Step S24).

The terminal device 30 receives the various input setting values and stores the received setting values in the setting value storage area 439 (Step S26).

Next, when the user selects a start button as job execution instruction input (Step S28), the terminal device 30 acquires the device information from the multifunction peripheral 10 (Step S30).

The terminal device 30 generates setting information on the basis of the stored various setting values. Then, the terminal device 30 transmits the generated setting information as an external command to the multifunction peripheral 10, using necessary connection information included in the device information acquired from the multifunction peripheral 10 (Step S32). In addition to the setting information pertaining to the job execution, the external command to be transmitted to the multifunction peripheral 10 may include other information such as an execution instruction command for job, an instruction, and the like.

The multifunction peripheral 10 then executes the job on the basis of the received external command (Step S34).

1.2.2 Process of Multifunction Peripheral 10

Now, a process of the multifunction peripheral 10 will be described with reference to a flowchart in FIG. 7. First, the controller 11 of the multifunction peripheral 10 determines whether or not the device state is device startup or recovery from a sleep mode (Step S100).

In a case where the controller 11 determines that the device state is the device startup or the recovery from the sleep mode, the controller 11 starts a device startup process. Specifically, the controller 11 reads the cooperation application program 233 and starts the cooperation application (Yes in Step S100→Step S110).

On the other hand, in a case where the controller 11 determines that the device state is not the device startup or the recovery from the sleep mode, the controller 11 determines whether or not the device state is input of auto clear (No in Step S100→Step S120).

In a case where the controller 11 determines that the device state is the input of auto clear, the controller 11 shifts the process to Step S130 (Yes in Step S120→Step S130). On the other hand, in a case where the controller 11 determines that the device state is not the input of auto clear, the controller 11 shifts the process to Step S210 (No in Step S120→Step S210).

Next, the controller 11 performs user authentication to device information display propriety determination (Step S130). The user authentication to the device information display propriety determination in Step S130 will be described with the next figure.

When the user authentication to the device information display propriety determination are terminated, the controller 11 determines whether or not, for example, a driver program, a session key, or other information related to the connection is updated (Step S140). In a case where there are the updated information and the like, the controller 11 reads the device information generation program 235, and updates the device information on the basis of the updated information (Yes in Step S140→Step S150).

Then, the controller 11 displays a display screen including the device information updated in Step S150 on the display 13 (Step S160).

On the other hand, in a case where there are no updated information and the like, the controller 11 does not update the device information, and displays this device information on the display 13 (No in Step S140→Step S160).

Next, the controller 11 determines whether or not a "close button" provided on the display screen including the device information is selected (Step S170). In a case where the "close button" is not selected, the controller 11 issues a request for acquiring a job (No in Step S170→Step S180).

Then, the controller 11 determines whether or not a job is acquired (Step S180). When it is determined that the job is acquired from the terminal device 30, the controller 11 executes the acquired job and terminates the process (Yes in Step S190→Step S200). When it is determined that the job is not acquired from the terminal device 30, the controller 11 returns the process to Step S170 (No in Step S190→Step S170).

In a case where the "close button" is selected, the controller 11 displays a home screen (Yes in Step S170→Step S210). In this case, the controller 11 does not output the job acquired from the terminal device 30.

Then, the controller 11 determines whether or not a job execution instruction is received via the home screen (Step S220). In a case where it is determined that the job execution instruction is input by the user via the home screen, the controller 11 executes the job and terminates the process (Yes in Step S2202→Step S200). In a case where the job execution instruction is not input, the controller 11 continues to display the home screen (No in Step S220→Step S210).

Next, the user authentication to the device information display propriety determination in Step S130 in FIG. 7 will be described with reference to FIG. 8 and FIG. 9. The controller 11 reads the user authentication program 234, the device information display propriety determination program 236, and the like, so that the process described herein can be executed.

Figure 8:
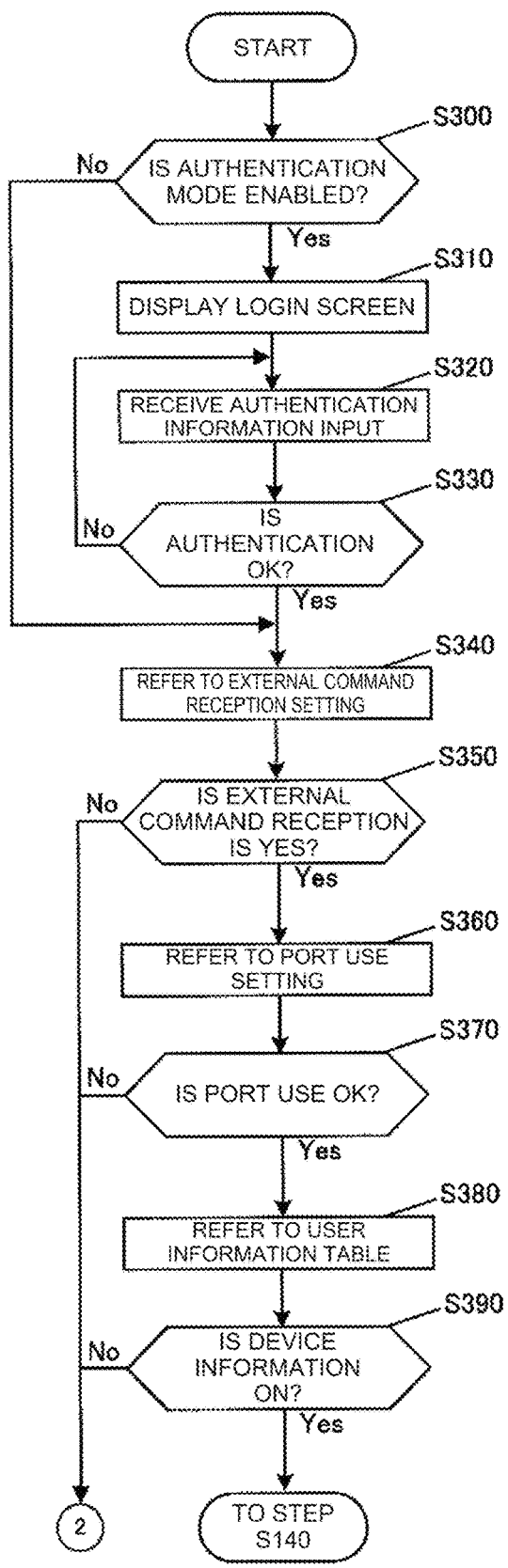
FIG. 8 is a flowchart illustrating a process of the multifunction peripheral according to the first embodiment.

FIG. 8 is a flowchart illustrating the user authentication to device information display propriety determination. First, the controller 11 determines whether the authentication mode for user authentication is enabled (ON). The authentication mode can be enabled/disabled, for example, by an administrator user with administrative authority via the settings screen or the like described below.

In a case where the authentication mode is enabled and, for example, an authentication process is performed on the basis of the authentication information input via the login screen, the controller 11 displays the login screen (authentication screen) on the display 13 (Step S310).

The controller 11 then receives input of a login user name and a login password as the authentication information via the login screen (Step S320). The controller 11 stores the login user name and the login password in association with each other, and performs the user authentication by checking the login user name and the login password, the input of which is received in Step S320.

Herein, FIG. 9A is a diagram illustrating a data configuration example of an authentication information table stored in the user information storage area 238. The authentication information table includes, for example, "ID", (login) "password", and (login) "user name" to uniquely identify a user. The controller 11 can perform the user authentication by checking the authentication information table for the combination of the login user name and the login password received via the login screen.

In a case where the user authentication is successful as a result of checking the login user name and the login password, the controller 11 refers to external command reception setting (Yes in Step S330→Step S340). The login user successfully authenticated is referred to as an authenticated user. On the other hand, in a case where the user authentication is not successful, the controller 11 returns the process to Step S320 (No in Step S330→Step S320).

Herein, the external command reception setting referenced by the controller 11 will be described. FIG. 9B is a diagram illustrating a data configuration example of the command reception setting table according to the first embodiment.

The command reception setting table illustrated in FIG. 9B includes "ID", "password", "user name", and "command reception YES/No". The "ID", the "password", and the "username" are the same items included in the authentication information table illustrated in FIG. 9A. The "command reception YES/No" is an item that indicates whether or not an external command can be received by each authenticated user as YES or No. For example, for the authenticated user with "user name Ai Ueo" pertaining to "ID 0001", the "command reception YES/No" is set to "YES". In this case, in a case where the user with "user name Ai Ueo" is logged into the multifunction peripheral 10 as the authenticated user, the controller 11 receives the external command transmitted from the terminal device 30. On the other hand, in a case where the user with "user name Tachi Tsuteto" is logged into the multifunction peripheral 10 as the authenticated user, the controller 11 does not receive the external command transmitted from the terminal device 30.

In a case where as the result of the reference to the external command reception setting, the setting of the external command reception for the authenticated user is "YES", the controller 11 refers to the port use setting (Yes in Step S350→Step S360).

Herein, the port use setting according to the first embodiment is to set the availability of a port (port number) for identifying services (application processes and threads) on TCP/UDP. FIG. 9C is a diagram illustrating a data configuration example of the port use setting table according to the first embodiment.

The port use setting table illustrated in FIG. 9C includes "ID", "password", "user name", and "port port No./NO". The "ID", the "password", and the "username" are the same items included in the authentication information table illustrated in FIG. 9A. The "port port No./NO" is an item indicating the availability of the port number for each authenticated user as port No. or "NO" indicating that the port is not available. For example, for the authenticated user with "user name Ai Ueo" pertaining to "ID 0001", the "port port No./NO" is set to "port No. 1". In this case, in a case where the user with "user name Ai Ueo" is logged in to the multifunction peripheral 10 as the authenticated user, the controller 11 permits the use of port No. 1. On the other hand, in a case where the user with "user name Tachi Tsuteto" is logged into the multifunction peripheral 10 as the authenticated user, the controller 11 disables the use of the port because the "port port No./NO" is set to "NO".

In the illustration in FIG. 9C, the port No. is illustrated as fictitious port No. such as "port No. 1" and "port No. 3", for example, to facilitate understanding. However, it is also acceptable to use a specific system port (well-known port) number such as "port No. 80 (https)", "port No. 443 (https)" and "port No. 21 (ftp)", other registered port numbers, a private number, or the like. It is also possible to set the availability of a protocol such as "http" "https", "smtp", and "pop", for each authenticated user in addition to or separately from port No.

In a case where, as a result of the reference to the port use setting, the port use setting for the authenticated user is acceptable (OK), the controller 11 refers to user information table (Yes in Step S370→Step S380).

Herein, the user information according to the present disclosure is the setting to turn on/off the display of the device information for each authenticated user. For example, FIG. 9D is a diagram illustrating a data configuration example of the user information table according to the first embodiment.

The user information table illustrated in FIG. 9D includes "ID", "password", "user name", and "device information ON/OFF". The "ID", the "password", and the "username" are the same items included in the authentication information table illustrated in FIG. 9A. The "device information ON/OFF" is an item that represents the display or non-display of the device information for each authenticated user as "ON/OFF". For example, for the authenticated user with "user name Ai Ueo" pertaining to "ID 0001", the "device information ON/OFF" is set to "ON". In this case, in a case where the user with "user name Ai Ueo" is logged into the multifunction peripheral 10 as the authenticated user, the controller 11 displays the device information. On the other hand, in a case where the user with "user name Tachi Tsuteto" is logged into the multifunction peripheral 10 as the authenticated user, the controller 11 does not display the device information because the "device information ON/OFF" is set to "OFF".

Figure 7:
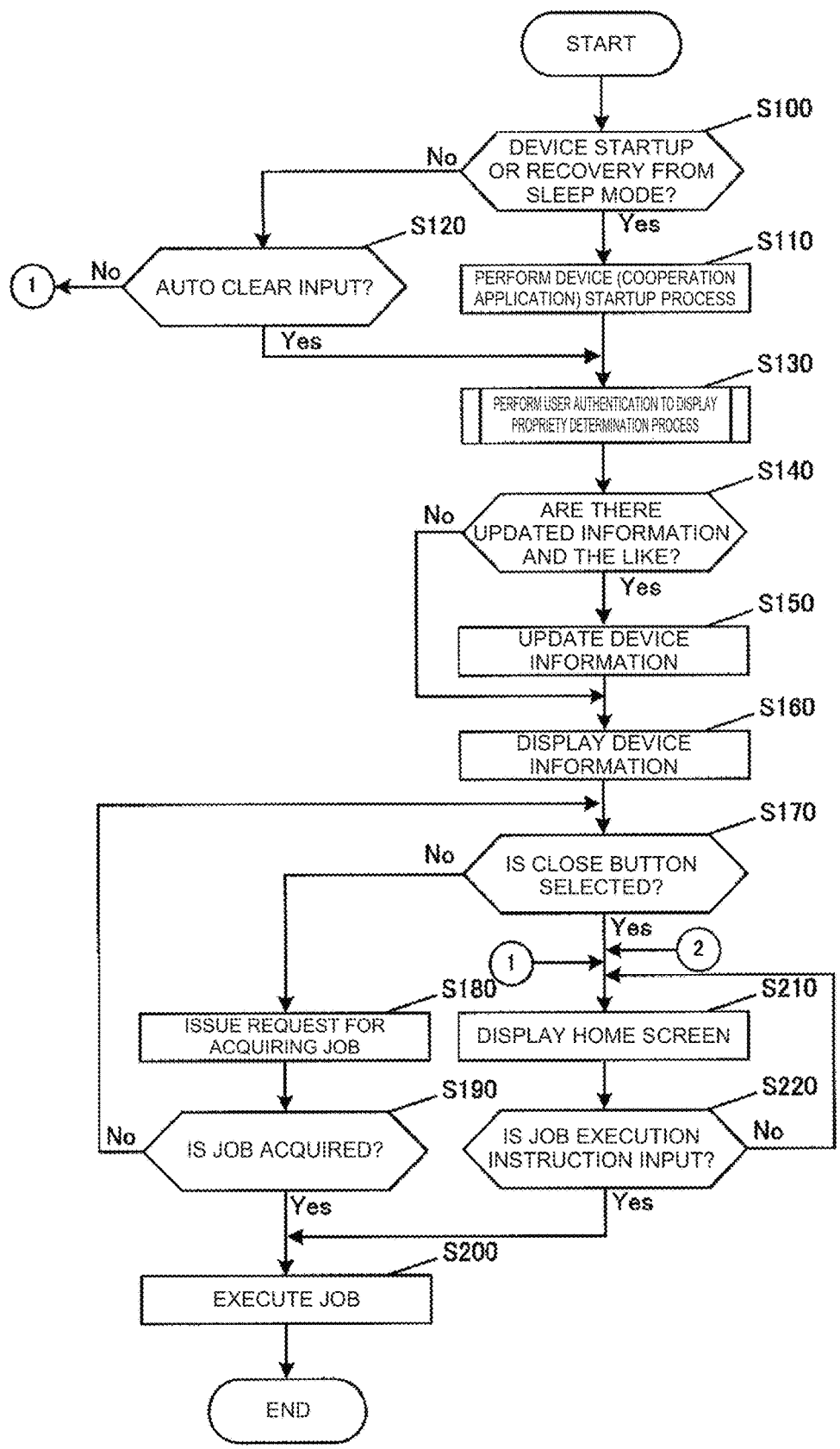
FIG. 7 is a flowchart illustrating a process of the multifunction peripheral according to the first embodiment.

In a case where, as a result of the reference to the user information table, the device information is ON, the controller 11 proceeds to Step S140 in FIG. 7 (Yes in Step S390→Step S140 in FIG. 7).

In a case where the external command reception is "NO" (No in Step S350), in a case where the port use is "NO" (Step S370; No), or in a case where the device information display is "OFF" (No in Step S390), the controller 11 displays the home screen without displaying the device information (Step S210 in FIG. 7) and executes Step S220 and subsequent processes.

1.2.3 Process of Terminal Device 30

Now, a flow of the process of the terminal device 30 will be described with reference to the flowchart in FIG. 10. The controller 31 of the terminal device 30 determines whether or not the user receives an instruction to start the cooperation application program 431 (Step S500).

In a case where the controller 31 determines that the user receives the instruction to start the cooperation application program 431, the controller 31 transmits the authentication information to the multifunction peripheral 10 (Yes in Step S500→Step S510).

The controller 31 then determines whether or not a response signal indicating that the authentication is successful is received from the multifunction peripheral 10 (Step S520). When it is determined that the response signal is received, the controller 31 displays the application screen as a user interface on the display 33 by reading the cooperation application program 431 (Step S530). When it is determined that no response signal is received, the controller 31 waits until the response signal is received (No in Step S520).

Subsequently, the controller 31 determines whether or not the user selects a copy job via the application screen (Step S540). When it is determined that the user selects the copy job, the controller 31 displays a copy job execution screen on the display 33 (Yes in Step S540→Step S550).

The controller 31 receives input of a setting value via the copy job execution screen displayed in Step S550 (Step S560). Then, the controller 31 stores the received setting value in the setting value storage area 439 (Step S570).

The controller 31 determines whether or not the user selects the "start button" (Step S580). In a case where it is determined that the "start button" is selected by the user, the controller 31 acquires the device information from the multifunction peripheral 10 (Yes in Step S580→Step S590). That is, after the selection of the start key, the controller 31 reads the device information acquisition program 433 and acquires the device information displayed on the display 13 of the multifunction peripheral 10.

Next, the controller 31 generates setting information from the various setting values stored in the setting value storage area 439, transmits the setting information by using the necessary connection information included in the device information acquired in Step S590 (Step S600), and terminates the process.

In a case where it is determined in Step S540 that the copy job is not selected by the user, the controller 31 determines whether or not a scan job is selected (No in Step S540→Step S610). In a case where it is determined that the scan job is selected, the controller 31 displays the scan job execution screen on the display 33 (Yes in Step S610→Step S620). After the scan job execution screen is displayed on the display 33, the controller 31 executes Step S560 and subsequent processes.

In a case where it is determined in Step S610 that no scan job is selected by the user, the controller 31 determines whether or not any other job (e.g., a fax job) is selected (No in Step S610→Step S630). In a case where it is determined that other job is selected, the controller 31 displays the job execution screen for the other job (Yes in Step S630→Step S640) and executes Step 560 and the subsequent process.

1.3 Operation Example

Figure 11:
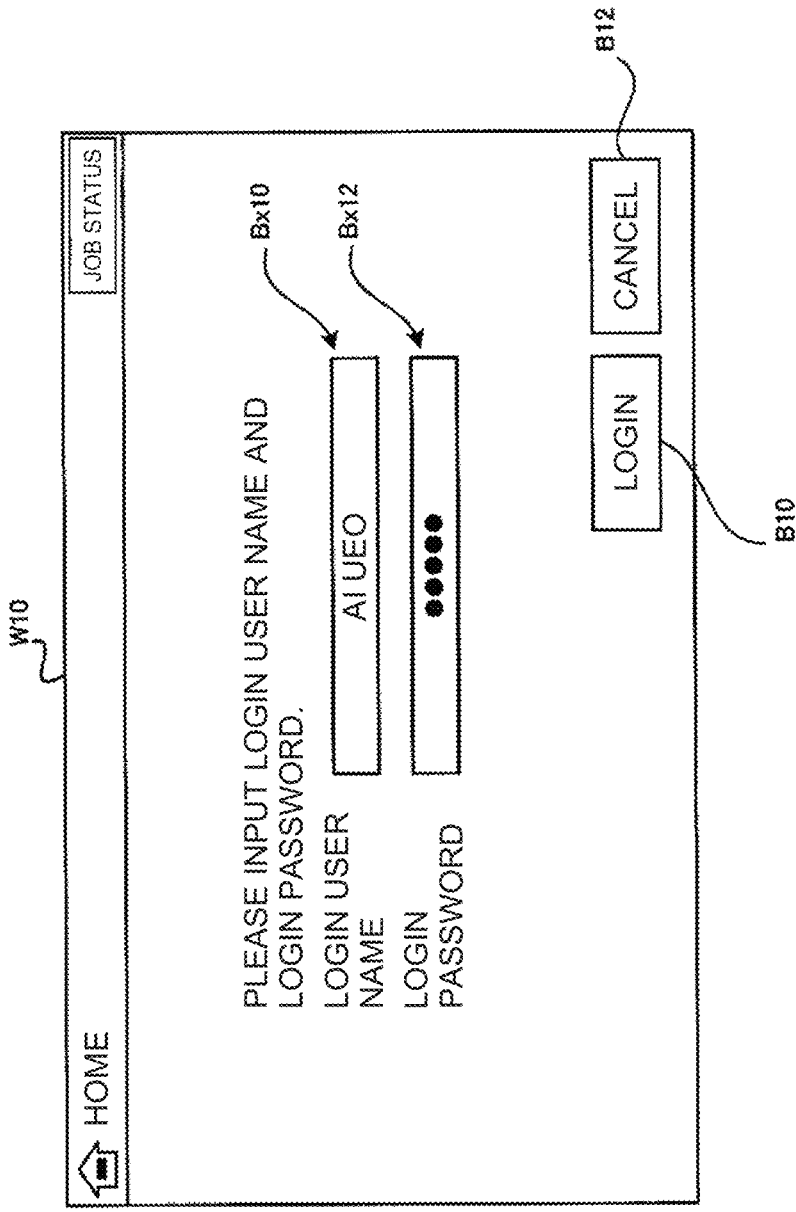
FIG. 11 is a diagram illustrating an operation example according to the first embodiment.

Now, an operation example according to the first embodiment will be described. FIG. 11 is a diagram illustrating a configuration example of a login screen W10 displayed on the display 13 when the controller 11 of the multifunction peripheral 10 reads the user authentication program 234. This operation example corresponds to the process in Step S310 of FIG. 8.

The login screen W10 includes a login user name input box Bx10, a login password input box Bx12, a login button B10, and a cancel button B22.

The login user name input box Bx10 is a box that receives input of a login user name of a user who attempts to log into the multifunction peripheral 10.

The login password input box Bx12 is a box that receives input of a login password associated with the login user name of the user who attempts to log into the multifunction peripheral 10.

The login button B10 is a button that receives an instruction to confirm an input content to the login user name input box Bx10 and the login password input box Bx12 by the user. The cancel button B22 is a button that receives input of a cancellation instruction for the authentication process. The user can input an execution instruction for the authentication process by selecting the login button B10 after inputting the login user name in the login user name input box Bx10 and inputting the login password in the login password input box Bx12.

Figure 12:
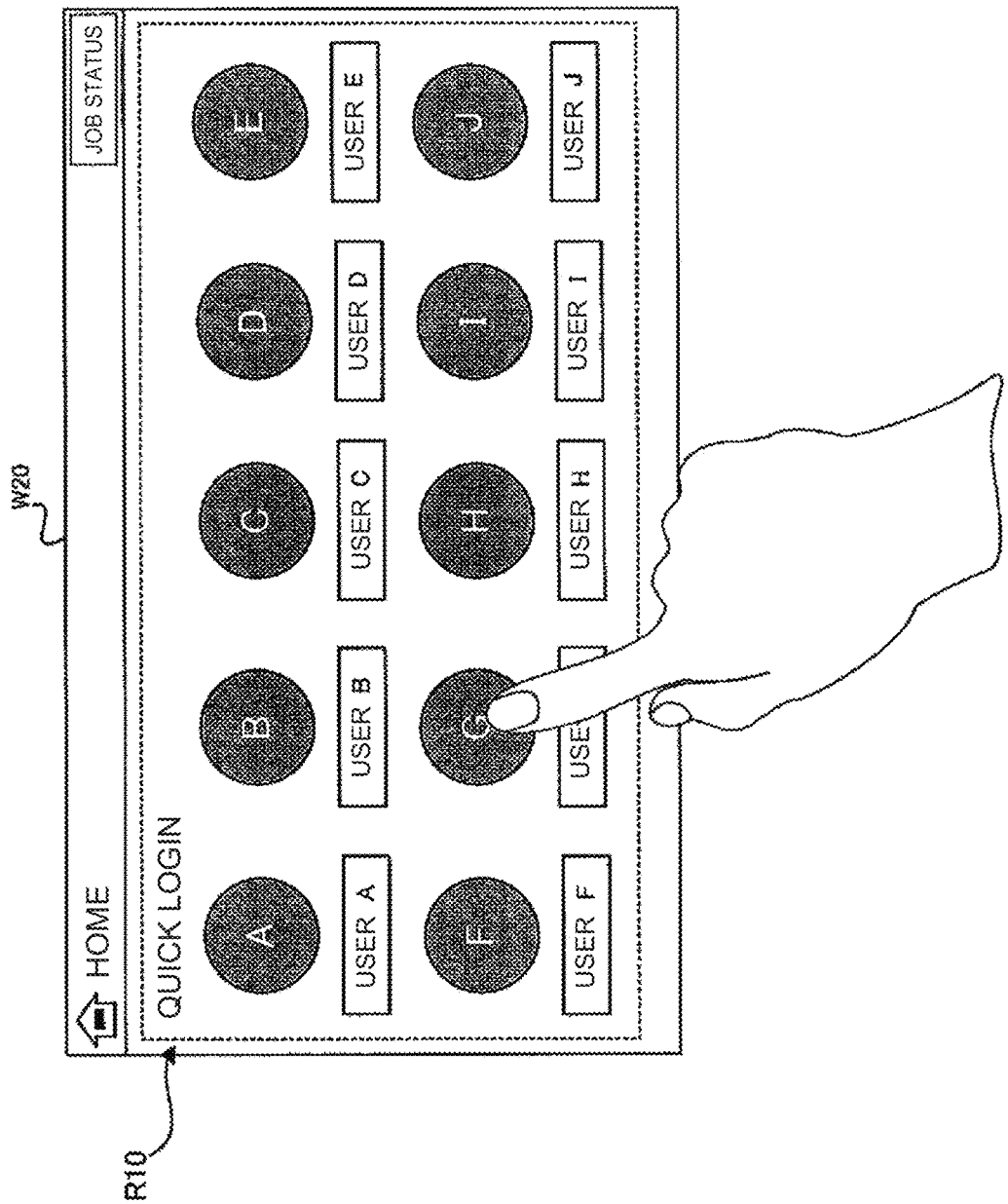
FIG. 12 is a diagram illustrating an operation example according to the first embodiment.

FIG. 12 is a diagram illustrating another mode of the login screen. A login screen W20 includes a selection button display area R10 that displays a selection button assigned to each user who attempts to log into the multifunction peripheral 10.

The selection button illustrated in the selection button display area R10 is created as an icons for each user on the basis of the user's authentication information (e.g., the login user name, the e-mail address, and the login password) registered via a user addition/editing screen (not illustrated).

A user who attempts to log into the multifunction peripheral 10 selects the icon (selection button) representing him or her. The login authentication can then be performed by inputting the login password via a login password input screen (not illustrated) that is displayed by selecting the icon. By selecting the icon representing the user, the login screen W20 can eliminate the need to input the login user name and perform a login process easily and quickly.

Figure 13:
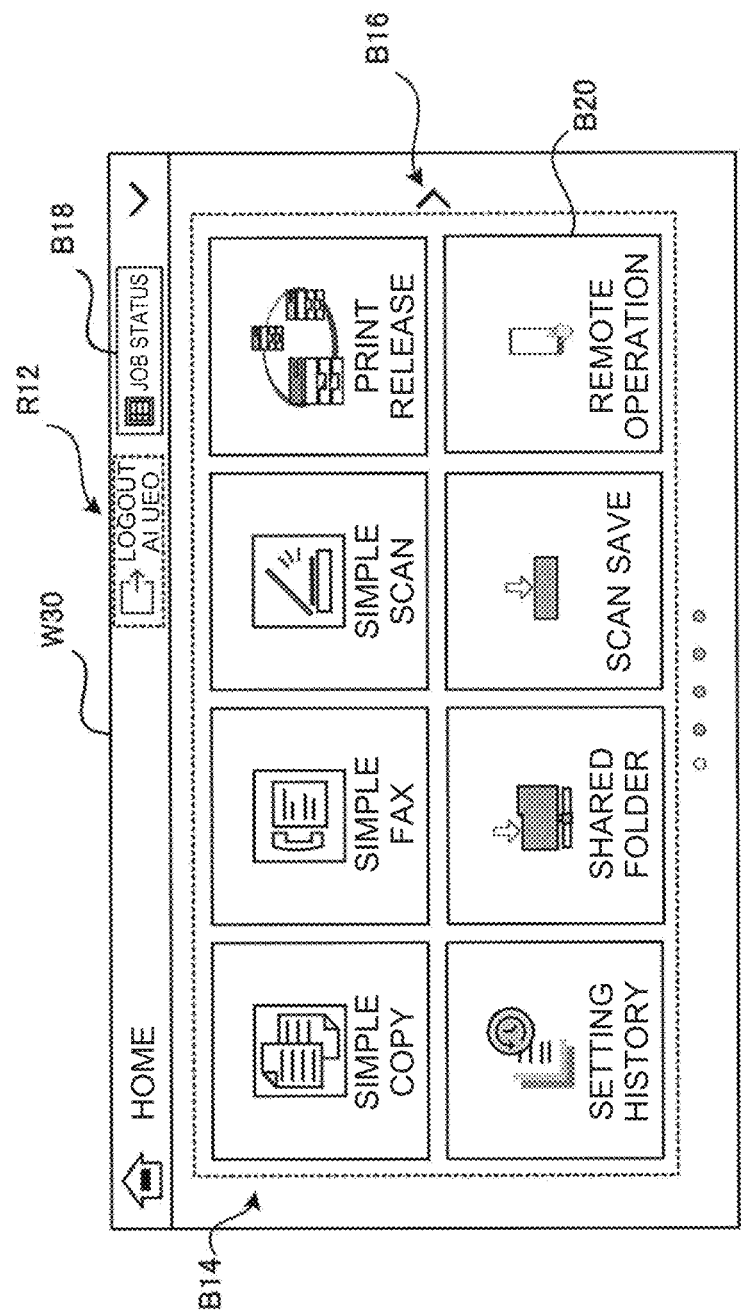
FIG. 13 is a diagram illustrating an operation example according to the first embodiment.

FIG. 13 is a diagram illustrating a configuration example of a home screen W30 that is displayed on the display 13 by the controller 11 in Step S210 of FIG. 7. The home screen W30 is a basic screen that receives selection of a job and selection of various function display by the user, for example. The home screen W30 includes job/function selection buttons B14, a display feed button B16, a job status button B18, and a login user name display area R12.

The job/function selection buttons B14 receives the selection of the job or function display, or the like, desired by the user. For example, when the user selects a "simple copy" button among the job/function selection buttons B14, the controller 11 displays a job execution screen (not illustrated) for setting the "simple copy". The job/function selection button B14 in the first embodiment also includes a remote operation button B20 for enabling a screen transition to a display screen W40 described with the next figure. When the user selects a remote operation button B20, the controller 11 shifts the screen display to the display screen W40 to enable use of an output method according to the present disclosure. The job/function selection buttons that are not displayed on the screen can be displayed by selecting the display feed button B16. The configuration example of the display of the job/function selection buttons B14 in FIG. 13 is only an example, and the configuration of the job/function selection buttons B14 is not limited to the illustration in FIG. 13.

The job status button B18 receives an instruction input for notifying a progress status of a job executed by the multifunction peripheral 10, a reservation status, or the like. When the user selects the job status button B18, the controller 11 displays the progress status, the reservation status, and the like of the job which are not illustrated.

The login user name display area R12 is a display area where the user name of the authenticated user who is logged into the multifunction peripheral 10 (in the example in FIG. 12, the authenticated user with the login user name "Ai Ueo") is displayed.

Figure 14:
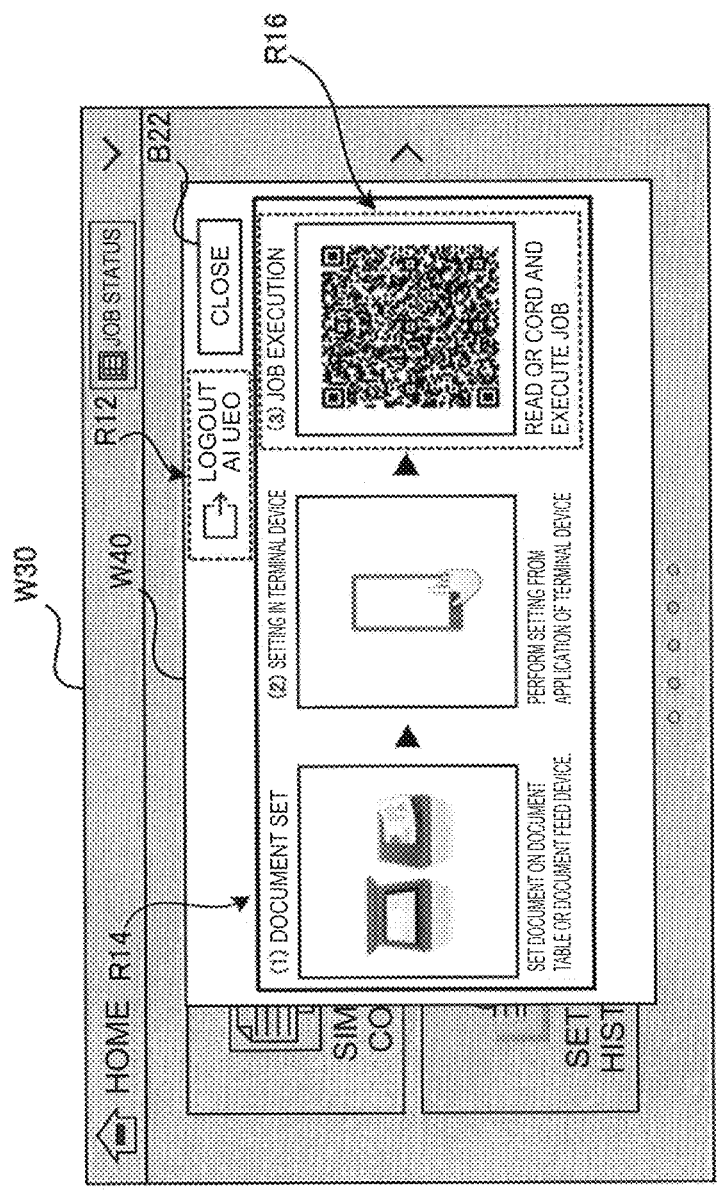
FIG. 14 is a diagram illustrating an operation example according to the first embodiment.

FIG. 14 illustrates a configuration example of the display screen W40 that is displayed on the display 13 by the multifunction peripheral 10. This operation example corresponds to the process of Step S160 in FIG. 7, and the display screen W40 is displayed at the time of device startup, sleep mode recovery or auto clear, or in a case where the remote operation button B20 on the home screen W30 is selected.

The display screen W40 includes an operation procedure display area R14 and a close button B22. The operation procedure display area R14 is an area for describing an operation procedure of the output method according to the first embodiment by an illustration or an animation. In the example illustrated in FIG. 14, the operation procedure is described in the following order: (1) document set, (2) setting in a terminal device, and (3) job execution.

The operation procedure display area R14 includes a device information display area R16 where the device information of the multifunction peripheral 10 is displayed. In the first embodiment, an example in which a quick response (QR) code is used as encoded information representing the device information will be described. The QR code (registered trademark) is a two-dimensional code representing data in a graphical form. In addition to the QR code, the information encoded using one or more of a barcode, a symbol, and an alphanumeric character may also be used as the device information. In the first embodiment, the device information displayed in the device information display area R16 is displayed in a case where the authentication mode according to the user authentication is enabled and the setting for receiving an external command for an authenticated user, port use, and device information display are all enabled.

The terminal device 30 can execute a job by reading the QR code displayed as the device information in the device information display area R16 by an imaging device such as a camera or a scanning device using a laser beam.

The close button B22 is a button that receives selection when the user desires the execution of the job via the normal home screen without using the output method according to the present disclosure. When the close button B22 is selected, the controller 11 displays the home screen W30 on the display 13.

Figure 15:
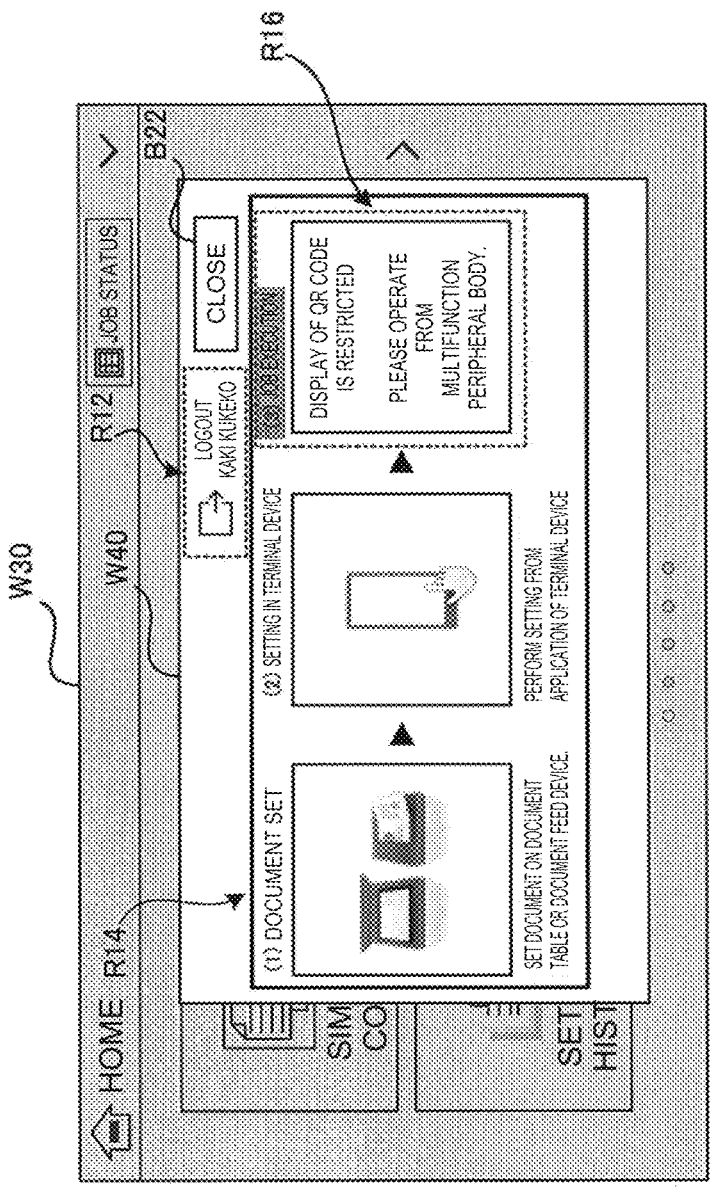
FIG. 15 is a diagram illustrating an operation example according to the first embodiment.

FIG. 15 is a diagram illustrating a display configuration example of the device information display area R16 in a case where the device information display is set to "disabled" (OFF). In a case where the display of the device information is disabled (for example, in a case where the authenticated user is "Kaki Kukeko" and only the display of the device information is "OFF" setting (see FIG. 9)), a message mentioning that "QR code is restricted. Please operate from a body of the multifunction peripheral." is displayed in the device information display area R16. Consequently, the user can know that operation from the body of the multifunction peripheral 10 is required without using the device information. In this case, the user can select the close button B22 to display the home screen W30 and then instruct the user to execute the job. In a case where only the display of the device information is set to "disabled (OFF)", control for performing transition to the home screen W30 without displaying the above message in the device information display area R16 may be performed.

Figure 16A:
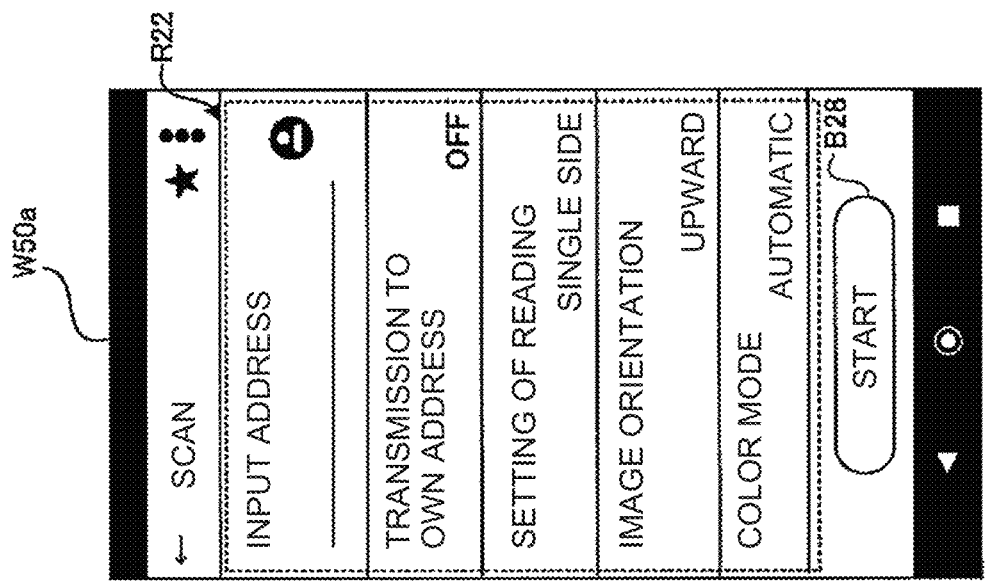
FIGS. 16A and 16B are a diagram illustrating an operation example according to the first embodiment.

FIG. 16A is a configuration example of an application screen W50 that is displayed on the display 33 by the controller 31 of the terminal device 30 after receiving a startup instruction of the cooperation application program 431 by the user. This operation example corresponds to the process in Step S530 of FIG. 10. The application screen W50 includes a menu display area R18 and a favorite list display area R20.

The menu display area R18 includes a copy job selection button, a scan job selection button B24, and a fax job selection button. The copy job selection button receives selection of a copy job by a user. When the copy job selection button is selected, the controller 31 can determine that the copy job is selected by the user. When the copy job selection button is selected, the controller 31 displays a copy job execution screen (not illustrated) on the display 33.

The scan job selection button B24 receives the selection of the scan job by the user. When the scan job selection button B24 is selected, the controller 31 can determine that a scan job is selected by the user. When the scan job selection button B24 is selected, the controller 31 displays the scan job execution screen W50a on the display 33.

The fax job selection button receives the user's selection of a fax job. When the fax job selection button is selected, the controller 31 can determine that the fax job is selected by the user. When the fax job selection button is selected, the controller 31 displays a fax job execution screen (not illustrated), on the display 33.

The favorite list display area R20 displays items frequently used by the user in a list format. The ascending and descending order display of the favorite list can be switched by a sort button B26.

Figure 16B:
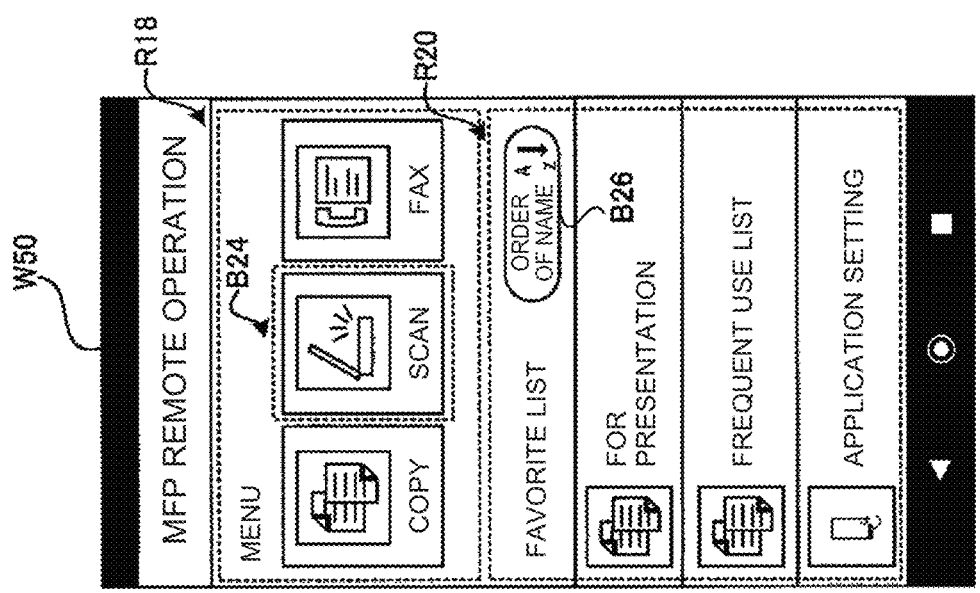

FIG. 16B is a diagram illustrating a configuration example of the scan job execution screen W50a displayed by the controller 31 in response to the selection of the scan job selection button B24 included in the menu display area R18. The scan job execution screen W50a includes a setting value setting area R22 and a start button B28.

The setting value setting area R22 is an area where input and selection of destination information and a setting value for scan job execution is received. The setting value setting area R22 includes setting items associated with the scan job execution such as items "input address" for receiving input and selection of an address serving as destination information, "transmission to own address", "setting of reading", "image orientation", and "color mode". The user can input and select destination information and setting values for a scan job via the setting value setting area R22.

The start button B28 is a button that receives input of an instruction to execute a scan job. After completing the input of the destination information and the setting values in the setting value setting area R22, the user can select the start button B28 to transmit the scan job execution instruction to the multifunction peripheral 10.

Figure 17:
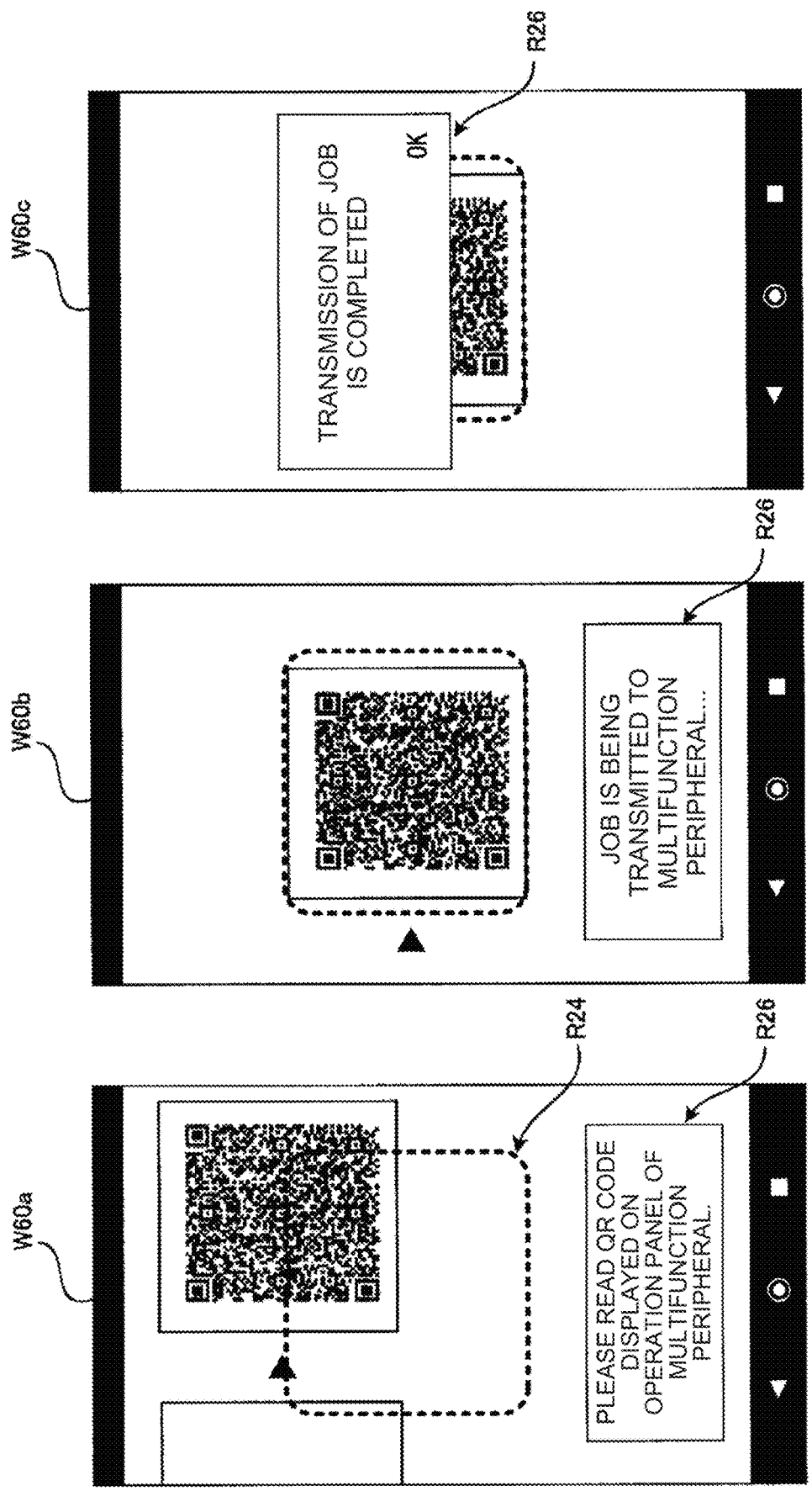
FIG. 17 is a diagram illustrating an operation example according to the first embodiment.

FIG. 17 illustrates a configuration example of a device information acquisition screen displayed by the controller 31 of the terminal device 30 when the start button B28 of the scan job execution screen W50a is selected and the device information being displayed in the multifunction peripheral 10 is acquired. A device information acquisition screen W60a includes a device information acquisition area R24 and a status display area R26.

As illustrated in FIG. 17, the device information acquisition area R24 may be configured as a guideline that guides the user such that, when the device information to be acquired is encoded information such as a QR code (registered trademark), the encoded information falls within a reading area of the imaging device or the scanning device. The user operates the terminal device 30 such that the encoded information such as a QR code (registered trademark) falls within the device information acquisition area R24.

The status display area R26 is an area where an operation or a job progress status (status) to the user is displayed. For example, the status display area R26 on the device information acquisition screen W60a is an example in which a message indicating that the QR code (registered trademark) is to be read while the QR code (registered trademark) falls within the device information acquisition area R24 is displayed.

When the QR code (registered trademark) is read and the device information is acquired, the controller 31 shifts the device information acquisition screen W60a to a device information acquisition screen W60b. On the device information acquisition screen W60b, a message indicating that a job is being transmitted to the multifunction peripheral 10 is displayed in the status display area R26.

After the transmission of the job to the multifunction peripheral 10 is completed, the controller 31 shifts the display screen to a device information acquisition screen W60c. On the device information acquisition screen W60c, a message indicating that the transmission of the job is completed is displayed in the status display area R26.

Figure 18:
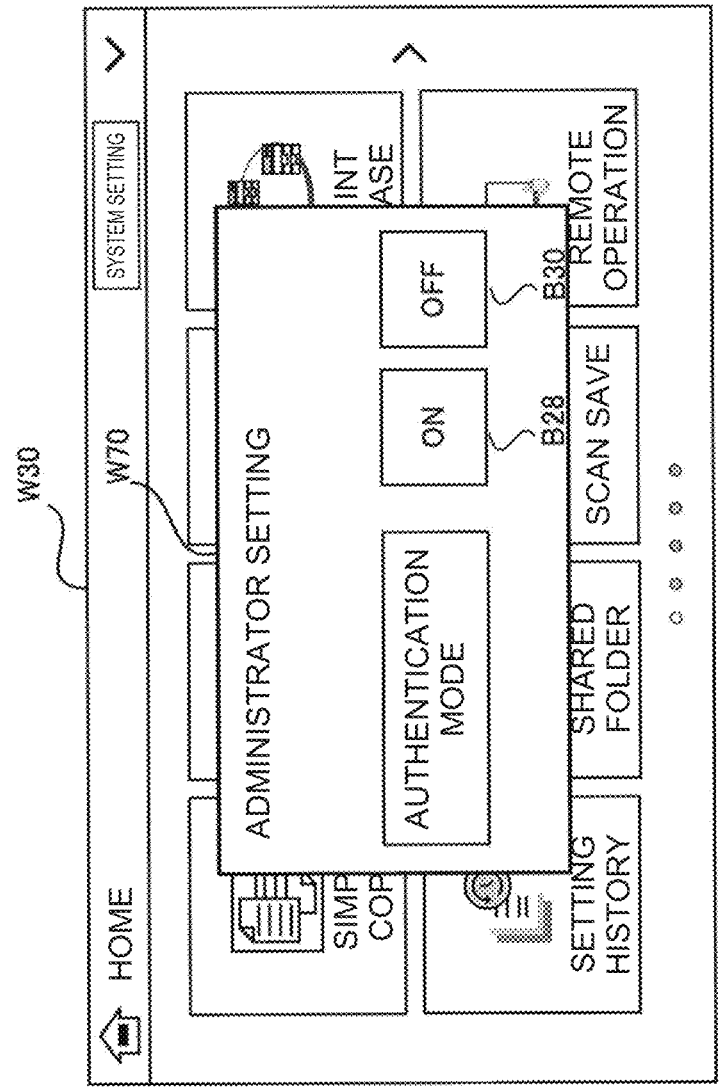
FIG. 18 is a diagram illustrating an operation example according to the first embodiment.

FIG. 18 is a diagram illustrating a configuration example of an authentication mode setting screen W70 for receiving setting of enabling/disabling of the authentication mode for the user authentication. The authentication mode setting screen W70 includes an ON button B28 for receiving the setting to enable (ON) the authentication mode and an OFF button B30 for receiving the setting to disable (OFF) the authentication mode.

The user can enable/disable the authentication mode by selecting either the ON button B28 or the OFF button B30.

Figure 19:
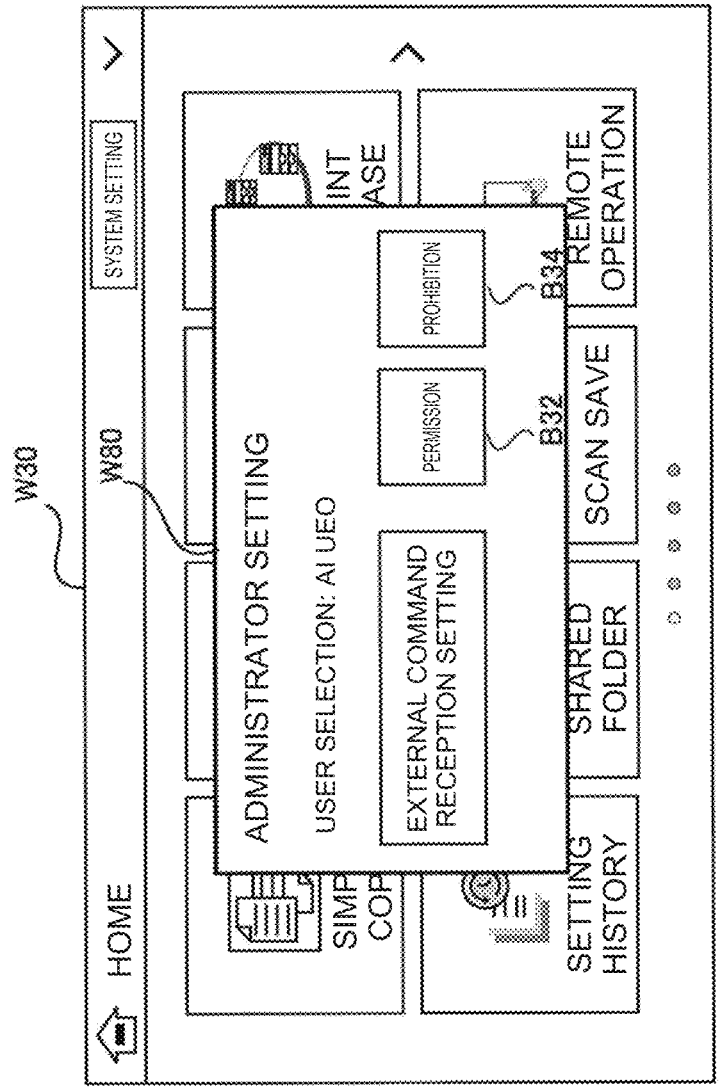
FIG. 19 is a diagram illustrating an operation example according to the first embodiment.

FIG. 19 is a diagram illustrating a configuration example of an external command reception setting screen W80 that receives setting for receiving or not receiving an external command for each authenticated user. The external command reception setting screen W80 includes a permission button B32 that receives setting of allowing (YES) the reception of an external command and a prohibition button B34 that receives setting of disallowing (NO) the reception of an external command.

The user can set whether or not to receive an external command for each authenticated user by selecting either the permission button B32 or the prohibition button B34. The setting content received on the external command reception setting screen W80 is stored in the command reception setting table.

Figure 20:
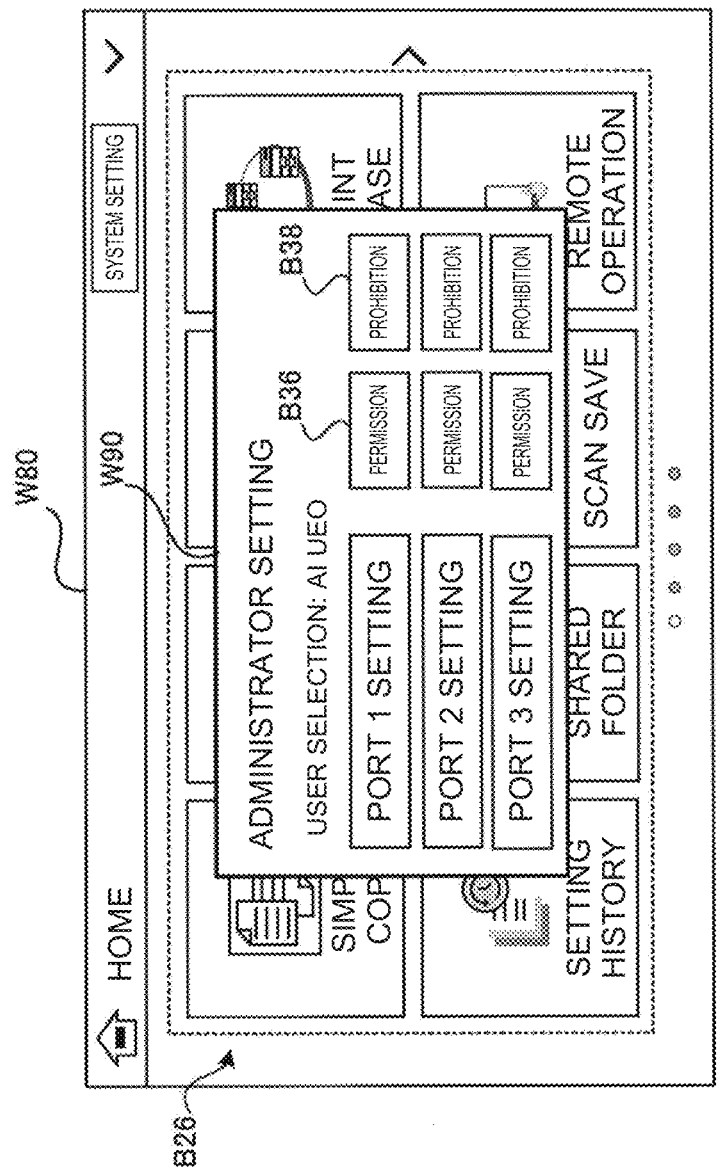
FIG. 20 is a diagram illustrating an operation example according to the first embodiment.

FIG. 20 is a diagram illustrating a configuration example of a port use setting screen W90 that receives port use setting for each authenticated user. The port use setting screen W90 includes a permission button B36 that receives setting of allowing the use of a port (port number) and a prohibition button B38 that receives setting of disallowing (NO) the use of a port (port number).

The user can perform port use setting for each authenticated user by selecting either the permission button B36 or the prohibition button B38. The setting content received on the port use setting screen W90 is stored in the port use setting table. Alternatively, the port use setting table to store the available port setting for the device itself may be provided. In this case, the same port availability is applied to any user on the basis of the setting in the table.

As described above, according to the first embodiment, with the authentication mode enabled, the display of the device information is controlled on the basis of the setting applied to each authenticated user such as reception of an external command and port use, so that it is possible to reduce the trouble associated with the display of the device information. Consequently, it is possible to provide an image processing device or the like with excellent operability.

2 Second Embodiment

A second embodiment is a form in which different operation authority can be applied to each authenticated user.
2.1 Functional Configuration A functional configuration of a multifunction peripheral according to the second embodiment can be substantially similar to that of the multifunction peripheral 10 according to the first embodiment. A functional configuration of a terminal device can also be substantially similar to that of the terminal device 30 according to the first embodiment. Therefore, in the second embodiment, identical configurations will be marked with the same reference numerals and the description thereof will be omitted.
2.2 Flow of Process
2.2.1 Process of Multifunction Peripheral 10

Figure 21:
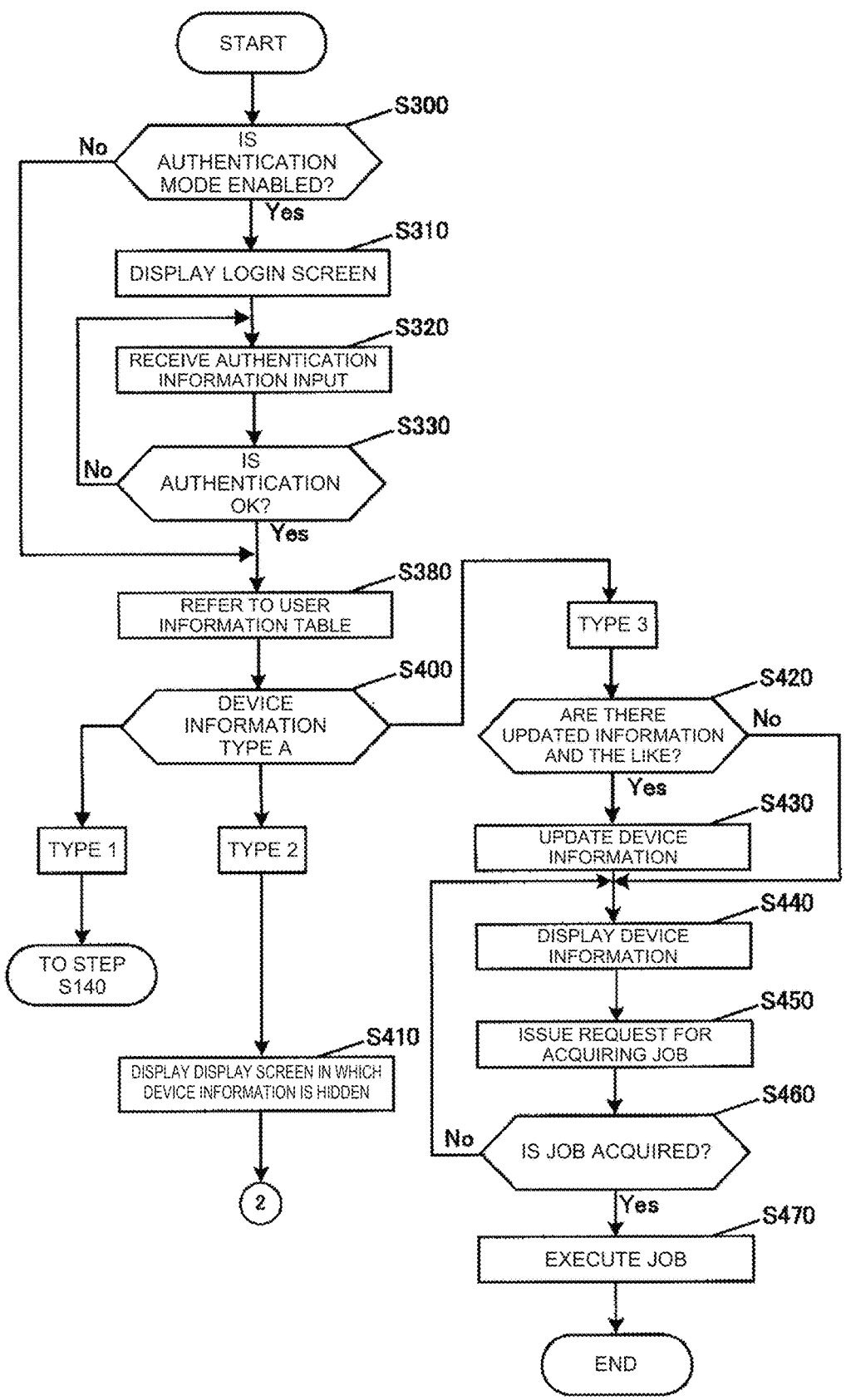
FIG. 21 is a flowchart illustrating a process of a multifunction peripheral according to a second embodiment.

The second embodiment differs from the first embodiment in the process after the process pertaining to user authentication in Step S330 of FIG. 8. Therefore, Step S330 and subsequent processes will be described with reference to the flowchart in FIG. 21.

In a case where user authentication is successful in Step S330, a controller 11 refers to a user information table (Yes in Step S330→Step S380). On the other hand, in a case where the user authentication is not successful, the controller 11 returns the process to Step S320 (No in Step S330→Step S320).

The controller 11 refers to the user information table to determine a device information type A for each authenticated user (Step S400).

In a case where it is determined that the device information type A is "type 1", the controller 11 shifts the process to Step S140 in FIG. 7 (Step S400; "type 1"→"Step S140").
In a case where it is determined that the device information type A is "type 2", the controller 11 displays a display screen in which the device information is hidden (Step S400; "type 2" →Step S410). In a case where "close button" is selected on the display screen, the controller 11 displays a home screen (Step S210 in FIG. 7), processes in Step S220 and Step S200 are executed.

Furthermore, in a case where the controller 11 determines that the device information type A is "type 3", the processes pertaining to Step S420 to Step S470 corresponding to Step S140 to Step S200 in FIG. 7 (Step S400; "type 3"→Step S420 to Step S470) are executed.

Herein, The device information type A according to the second embodiment will be described with reference to FIG. 22. FIG. 22 is a diagram illustrating a data configuration example of a user information table according to the second embodiment.

The user information table illustrated in FIG. 22 includes "ID", "password", "user name", and "device information type A". The "ID", the "password", and the "username" are the same items included in the authentication information table illustrated in FIG. 9A. The "device information type A" represents operation authority set for each authenticated user.

Herein, the type 1 is operation authorization given to a user who is allowed to operate a device from a body when the device information is displayed and the display of the device information is canceled. The type 2 is operation authority given to a user who is not allowed to display the device information and is only allowed to operate the device from the body. The type 3 is operation authority given to a user who can operate only from the displayed device information.

In other words, in the second embodiment, different operation authority can be given to each authenticated user. For example, a user who has a network connection problem in exchanging information via device information or a user who does not wish to remotely operate a multifunction peripheral should be given the operation authority pertaining to the type 2, and only operation from the multifunction peripheral body should be permitted. On the other hand, it is possible to restrict operation from the body of the multifunction peripheral by giving the operation authority according to the type 3 to the user who may perform unnecessary operation on the multifunction peripheral.

FIG. 22 is an example in which the "type 1" of the device information type A is set to the "user name Ai Ueo" pertaining to "ID 0001" and the "user name Kaki Kukeko" pertaining to "ID 0002". Similarly, the "type 2" of the device information type A is set to the "user name Tachi Tsuteto" pertaining to "ID 0003", and the "type 3" of the device information type A is set to the "user name Nani Nuneno" pertaining to "ID 0004".

Figure 23A:
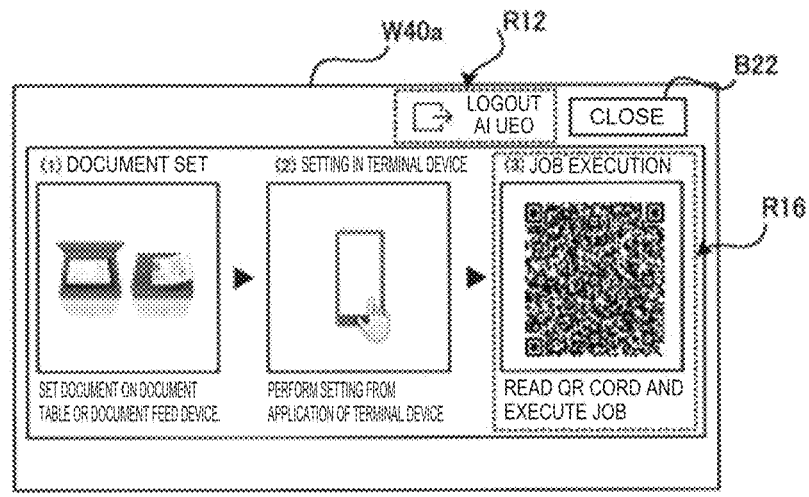
FIGS. 23A to 23C are a diagram illustrating an operation example according to the second embodiment.

FIG. 23A is a diagram illustrating a form of a display screen W40a that is displayed in a case where the device information type A is set to the "type 1". In a case where the device information type A is the "type 1", a QR code (registered trademark) as device information is displayed in a device information display area R16, and a close button B22, which receives an instruction to cancel the display of device information (display screen W40a), is also displayed. By the selection of the close button B22, the home screen W30 illustrated in FIG. 12 is displayed, and a user can operate from the body of the multifunction peripheral 10.

Figure 23B:
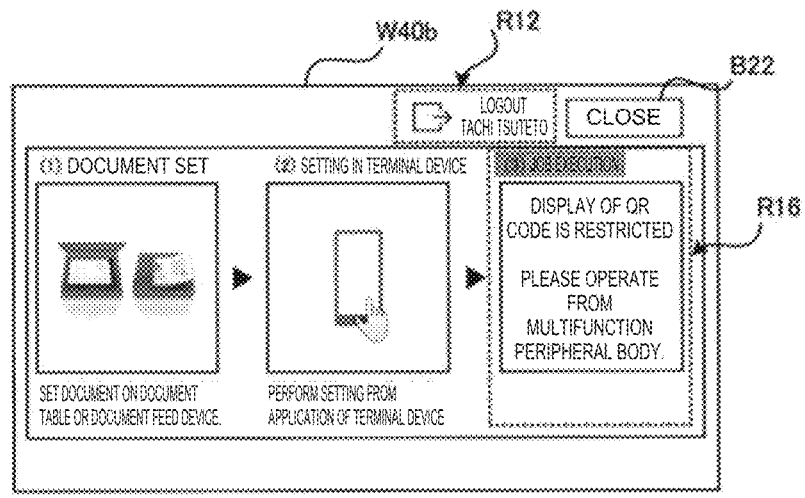

FIG. 23B is a diagram illustrating a form of a display screen W40b that is displayed in a case where the device information type A is set to the "type 2". In a case where the device information type A is the "type 2", the QR code (registered trademark) as device information is displayed in the device information display area R16. However, the close button B22 is displayed, and therefore the user can operate from the body of the multifunction peripheral 10 via the home screen W30.

Figure 23C:
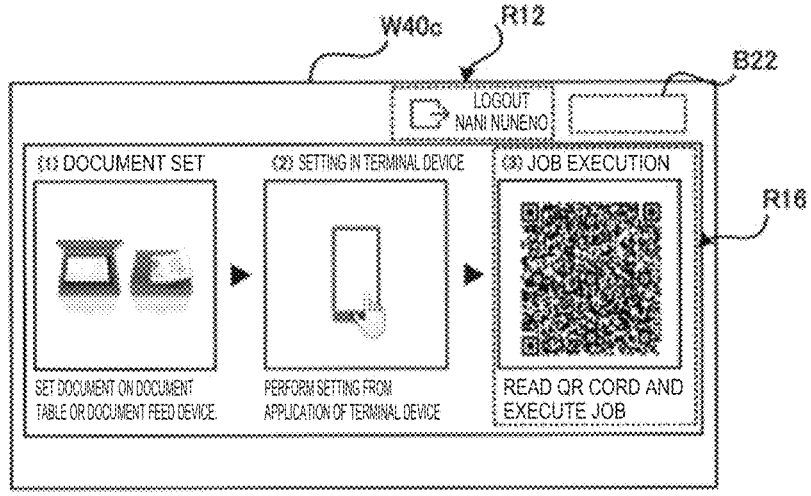

FIG. 23C is a diagram illustrating a form of a display screen W40c that is displayed in a case where the device information type A is set to the "type 3". In a case where the device information type A is the "type 3", the QR code (registered trademark) as the device information is displayed in the device information display area R16, but the close button B22 is not displayed. The close button B22 is not provided, and therefore the user cannot display the home screen W30, and cannot perform operation from the body of the multifunction peripheral 10.

As described above, according to the second embodiment, it is possible to reduce the trouble associated with the display of the device information, and different operation authority can be granted to each authenticated user, and give operation authority for each authenticated user, and therefore it is possible to manage each authenticated user in accordance with the operation authority, and perform more flexible device operation.

3 Third Embodiment

A third embodiment is a form in which determination information pertaining to display propriety of device information is acquired from a terminal device 30.

3.1 Functional Configuration

A functional configuration of a multifunction peripheral according to the third embodiment can be substantially similar to that of the multifunction peripheral 10 according to the first embodiment. A functional configuration of a terminal device can also be substantially similar to that of the terminal device 30 according to the first embodiment. Therefore, in the third embodiment, identical configurations will be marked with the same reference numerals and the description thereof will be omitted.

3.2 Flow of Process 3.2.1 Process of Multifunction Peripheral 10

Figure 24:
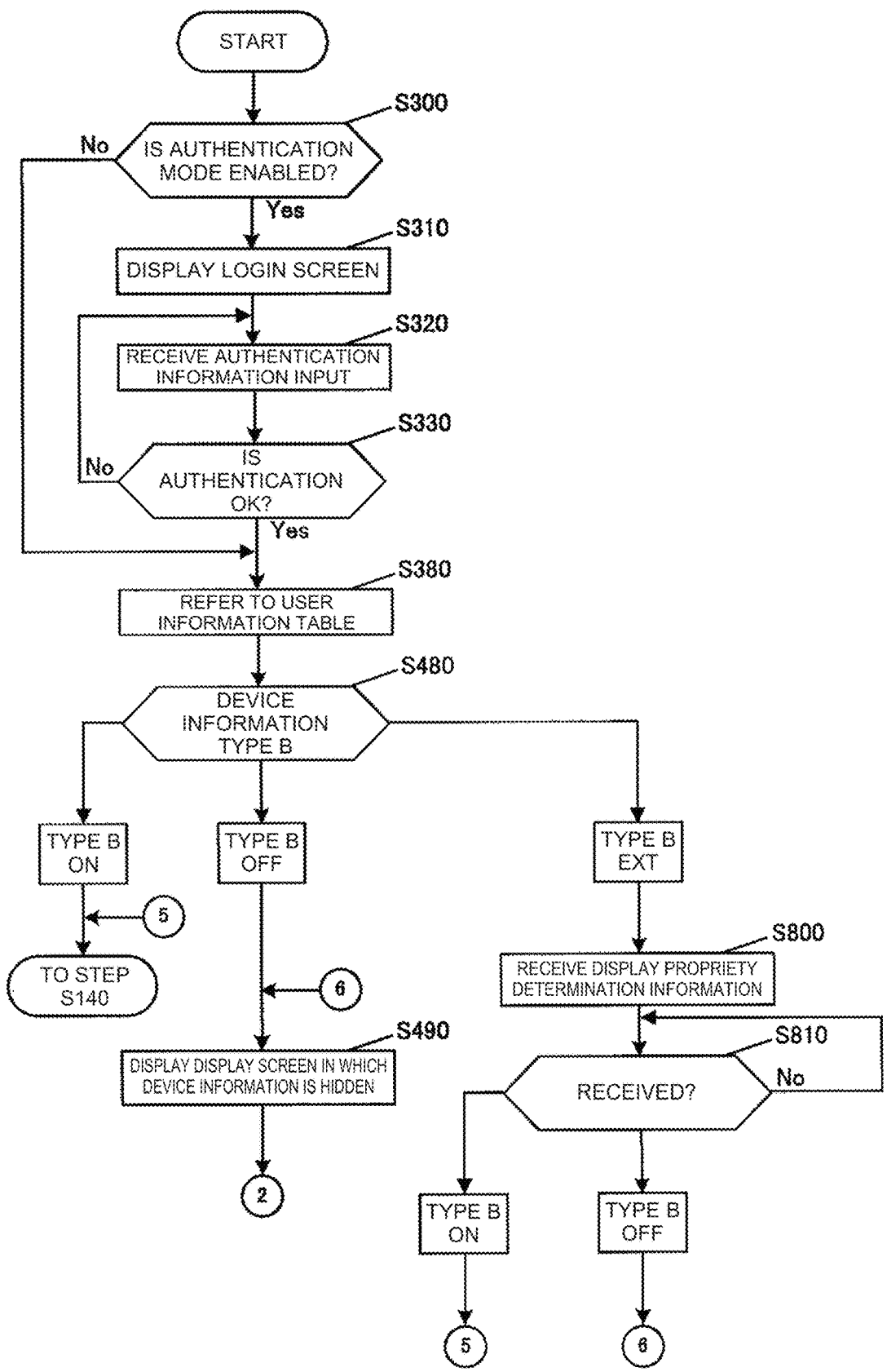
FIG. 24 is a flowchart illustrating a process of a multifunction peripheral according to a third embodiment.

The third embodiment differs from the first embodiment in the process after the process pertaining to user authentication in Step S330 of FIG. 8, similar to the second embodiment. Therefore, Step S330 and subsequent processes will be described with reference to the flowchart in FIG. 24.

In a case where user authentication is successful in Step S330, a controller 11 refers to a user information table (Yes in Step S330→Step S380). On the other hand, in a case where the user authentication is not successful, the controller 11 returns the process to Step S320 (No in Step S330→Step S320).

The controller 11 refers to the user information table to determine a device information type B for each authenticated user (Step S480).

In a case where it is determined that the device information type B is "type B ON", the controller 11 shifts the process to Step S140 in FIG. 7 (Step S480; "type B ON"→"Step S140"). In a case where it is determined that the device information type B is "type B OFF", the controller 11 displays a display screen in which the device information is hidden (Step S480; "type B OFF"→Step S490). In a case where "close button" is selected on the display screen, the controller 11 displays a home screen (Step S210 in FIG. 7), processes in Step S220 and Step S200 are executed.

Furthermore, in a case where the controller 11 determines that the device information type B is "type B EXT", it is determined whether or not display propriety determination information as determination information pertaining to display propriety of the device information is received from the terminal device 30 (Step S480; "type B EXT"→Step S800).

In a case where it is determined that the display propriety determination information is received from the terminal device 30, and the device information type B is the "type B ON", the controller 11 shifts the process to Step S140 in FIG. 7 (Step S810; "type B ON"→"Step S140"). In a case where it is determined that the device information type B is the "type B OFF", the controller 11 displays the display screen with the hidden device information is displayed (Step S810; "type B OFF"→"Step S490"). In a case where "close button" is selected on the display screen, the controller 11 displays a home screen (Step S210 in FIG. 7), processes in Step S220 and Step S200 are executed.

In a case where the display the propriety determination information is not received from the terminal device 30, the controller waits until the propriety determination information is received (No in Step S810).

3.2.2 Process of Terminal Device 30

Figure 10:
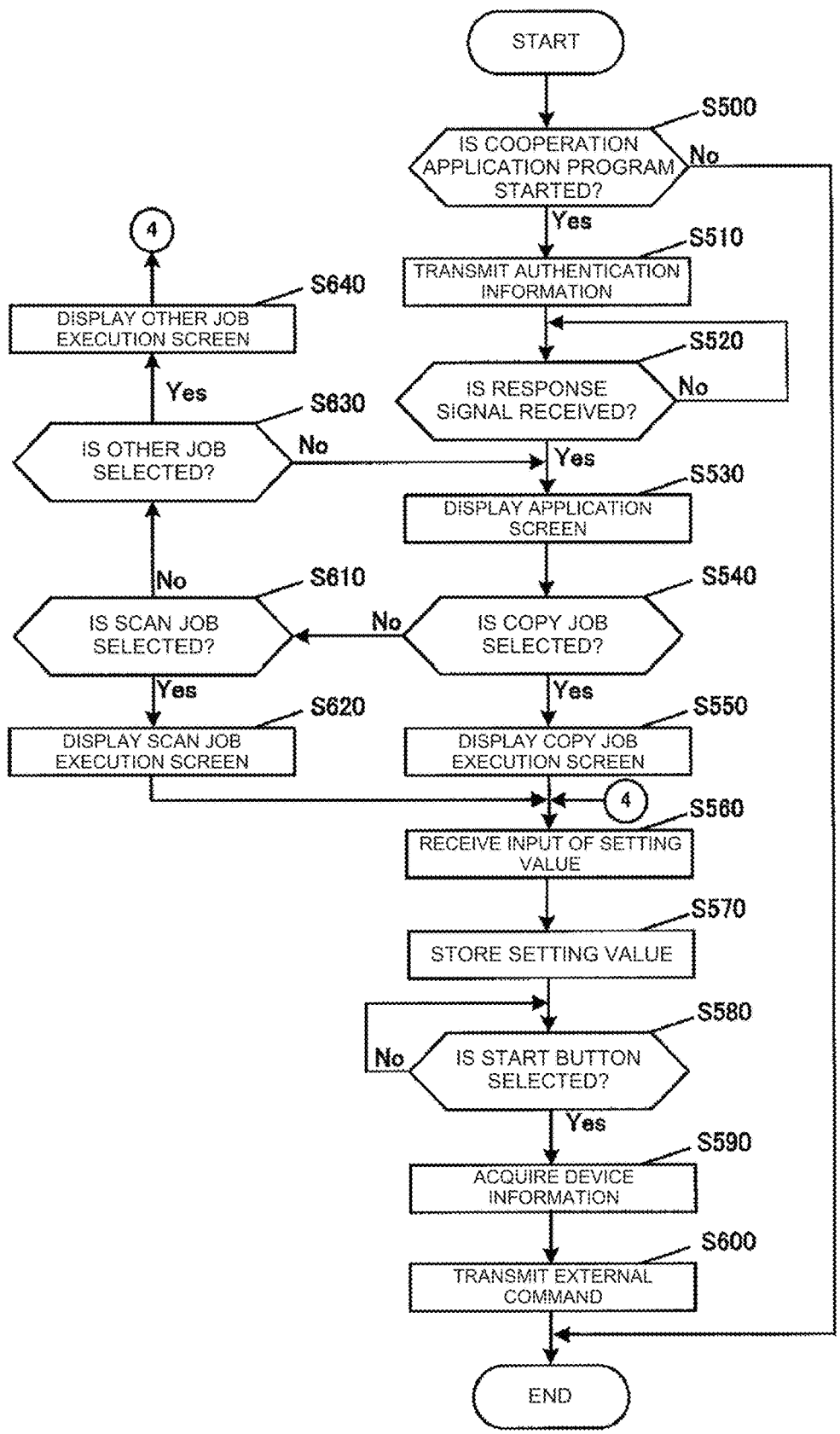
FIG. 10 is a flowchart illustrating a process of the terminal device according to the first embodiment.

As to a flow of the process of the terminal device 30 according to the third embodiment, only the transmission of the display ON/OFF information of the device information is added to the process pertaining to Step S510 described in FIG. 10 of the first embodiment, and the other processes can be performed in the same manner. Therefore, the process of the terminal device 30 herein will be omitted.

FIG. 25A is a diagram illustrating a data configuration example of a user information table according to the third embodiment.

The user information table illustrated in FIG. 25A includes "ID", "password", "user name", and "device information type B". The "ID", the "password", and the "username" are the same items included in the authentication information table illustrated in FIG. 9A. The "device information type B" is an item that represents the display or non-display of device information for each authenticated user as "ON/OFF". The user information table differs from the user information table illustrated in FIG. 9D of the first embodiment in that the determination information pertaining to the display propriety of display device information is acquired from the terminal device 30.

For example, for an authenticated user with "User Name Nani Nuneno" pertaining to "ID 0004", "EXT" (acquire display propriety determination information from the terminal device 30) is set as "device information type B".

FIG. 25B is a diagram illustrating a data configuration example of the display propriety determination information transmitted to the multifunction peripheral 10 by the terminal device 30 in Step S510 of FIG. 10. FIG. 25B is an example of applying the setting of turning on the display of device information to the authenticated user with "user name Nani Nuneno" pertaining to "ID0004".

3.3 Operation Example

Figure 26B:
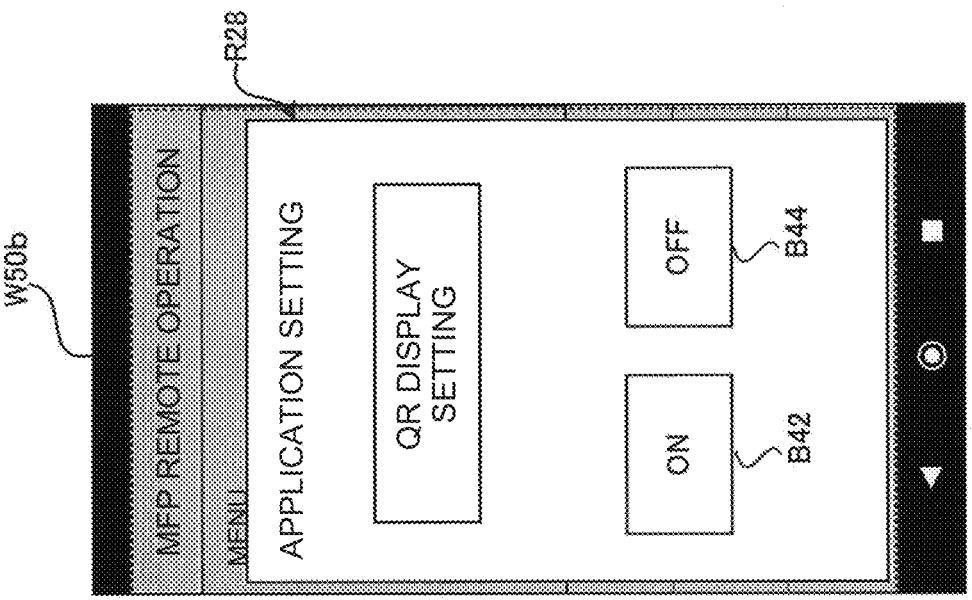
FIGS. 26A and 26B are a diagram illustrating an operation example according to the third embodiment.
Figure 26A:
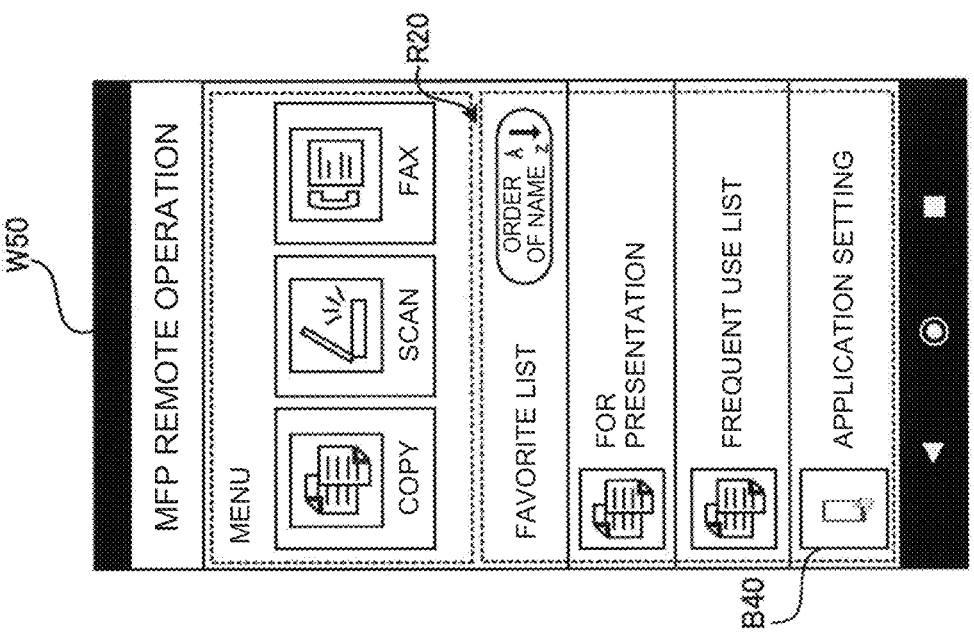

Now, an operation example according to the third embodiment will be described with reference to FIGS. 26A and 26B. FIGS. 26A and 26B are a diagram illustrating an operation example in which the display propriety determination information is generated via an application screen W50 of the terminal device 30.

When a user selects an application setting button B40 included in a favorite list display area R20 of the application screen W50 illustrated in FIG. 26A, a controller 31 displays an application setting area R28 illustrated in FIG. 26B. The application setting area R28 includes a QR display setting item. The user can enable (ON) the display of the device information by selecting an ON button B42 provided in the application setting area R28. On the other hand, in a case where the display of the device information is to be disabled (OFF), the user can set the display of the device information to be disabled (OFF) by selecting an OFF button B44.

As described above, according to the third embodiment, it is possible to reduce the trouble associated with the display of the device information, and since the display propriety determination information pertaining to the display determination of the device information is acquired from the terminal device and set, it is possible to perform more flexible device operation in cooperation with the terminal device.

4 Fourth Embodiment

A fourth embodiment is a form related to an output system including a multifunction peripheral, a terminal device, and a network service. The terminal device can execute a job of the multifunction peripheral through the network service.

FIG. 27 is a diagram illustrating an overall configuration of an output system 200 according to the fourth embodiment. The output system 200 includes a multifunction peripheral 10, a terminal device 30, and a network service 50. The output system 200 can be separately provided with an external authentication server (not illustrated) or the like that authenticates a user to the multifunction peripheral 10.

The multifunction peripheral 10 is communicatively connected to the network service 50 via a network (NW) illustrated in a solid line in the figure. The terminal device 30 is configured so as to be able to acquire device information from the multifunction peripheral 10.

4.1 Functional Configuration

A functional configuration of the multifunction peripheral according to the fourth embodiment can be substantially similar to that of the multifunction peripheral 10 according to the first embodiment. A functional configuration of a terminal device can also be substantially similar to that of the terminal device 30 according to the first embodiment. Therefore, in the fourth embodiment, identical configurations will be marked with the same reference numerals and their description will be omitted.

4.1.1 Network Service 50

The network service 50 is a computing system, which is referred to as a so-called cloud, and provides a predetermined service such as a processing resource, a storage resource, and a delivery resource via, for example, a web browser. The service provided by the network service 50 may be used by accessing from the multifunction peripheral 10 or the terminal device 30 via the network (NW) using any data communication protocol such as a transfer control protocol, an Internet protocol, and other protocols. The network service 50 includes one or more network devices as hardware. In the following description, when no special hardware configuration is described, the hardware will be simply described as the network service 50.

Figures 28, 29:
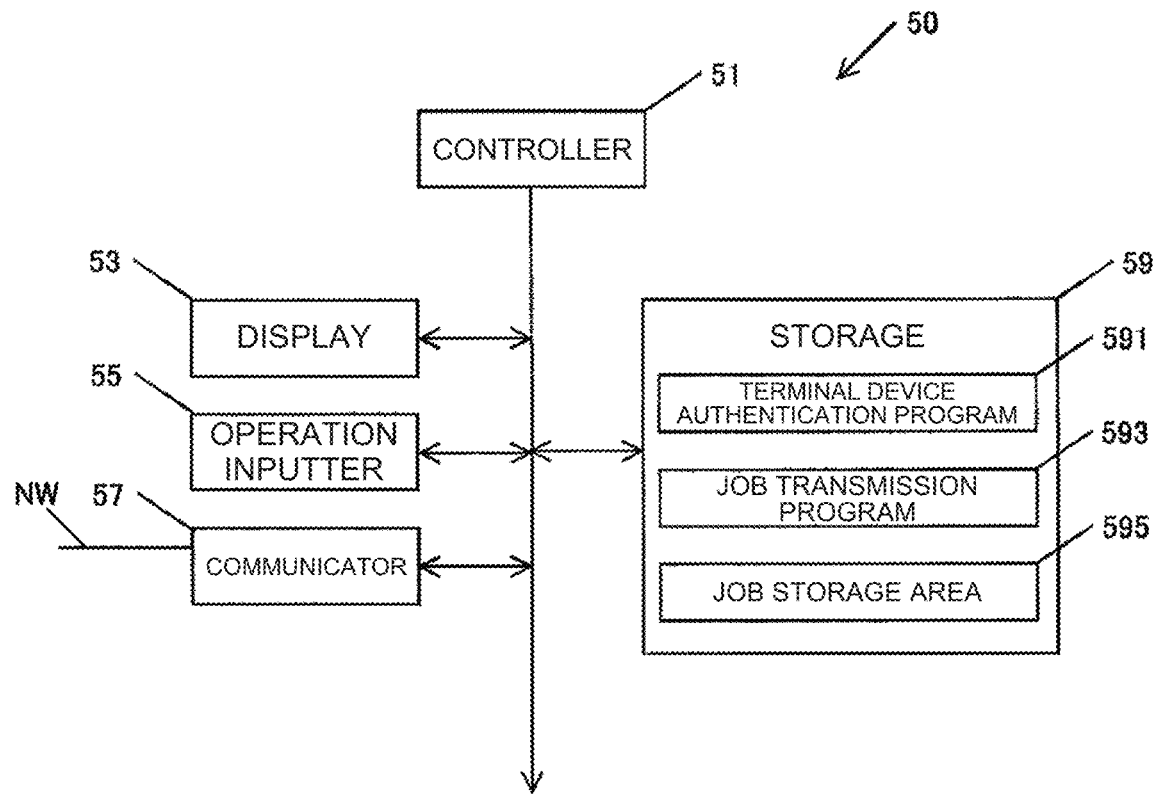
FIG. 28 is a diagram illustrating a functional configuration of network service according to the fourth embodiment.
FIG. 29 is a diagram illustrating a data configuration example of a job stored in the job storage area.

FIG. 28 is a functional configuration diagram illustrating a configuration example of the hardware included in the network service 50. The network service 50 includes a controller 51, a display 53, an operation inputter 55, a communicator 57, and a storage 59.

The controller 51 controls the overall network service 50. The controller 51 is composed of, for example, one or more arithmetic devices (such as CPUs). The controller 51 reads and executes various programs stored in the storage 59 to implement functions thereof.

The display 53 displays various pieces of information to a user and the like. The display 53 can include, for example, an LCD, an organic EL display, of the like.

The operation inputter 55 receives input of information performed by the user or the like. As the operation inputter 55, an inputter such as a keyboard, a mouse, and a touchpad can be used, for example.

The communicator 57 includes either a wired or wireless interface or both wired and wireless interfaces to communicate with other devices via a LAN, a WAN, the Internet, a telephone line, or the like.

The storage 59 stores various programs needed for the operation of the network service 50 and various types of data. The storage 59 may include a storage device such as a RAM, an HDD, an SSD, and a ROM.

In the fourth embodiment, the storage 59 stores a terminal device authentication program 591, and a job transmission program 593, and ensure a job storage area 595.

The terminal device authentication program 591 is a program read by the controller 51 when the connection with the terminal device 30 is authenticated. The controller 51 which reads the terminal device authentication program 591 authenticates the connection with the terminal device 30 on the basis of a session key of connection information transmitted together with an external command when the external information including setting information is transmitted from the terminal device 30.

The job transmission program 593 is a program read by the controller 51 when a job is transmitted to the multifunction peripheral 10. The controller 51 that has read the job transmission program 593 searches for a job corresponding to the device ID of the multifunction peripheral 10 to HTTPS (Hyper text transfer protocol secure) long polling from the multifunction peripheral 10, for example. In a case where the job corresponding to the device ID of multifunction peripheral 10 is stored in the job storage area 595, the controller 51 reads the job and transmits the job to the multifunction peripheral 10.

The job storage area 595 is a storage area in which an external command with a job ID, transmitted from the terminal device 30, is stored. The job ID may also be given by the terminal device 30. In this case, the terminal device 30 only needs to give the job ID to setting information and connection information included in the external command and transmit the information to the network service 50. The controller 51 that receives the external command is stored as the job in the job storage area 595.

Herein, FIG. 29 is a diagram illustrating a data configuration example of the job stored in the job storage area 595. The connection information and the setting information is identical to those illustrated in FIG. 5A. The controller 51 that receives these information as an external command gives a "job ID" (e.g., "#0001") for uniquely identifying the job to the connection information and the setting information, and stored these information in the job storage area 595.

4.2 Flow of Process

4.2.1 Overall Process

Figure 30:
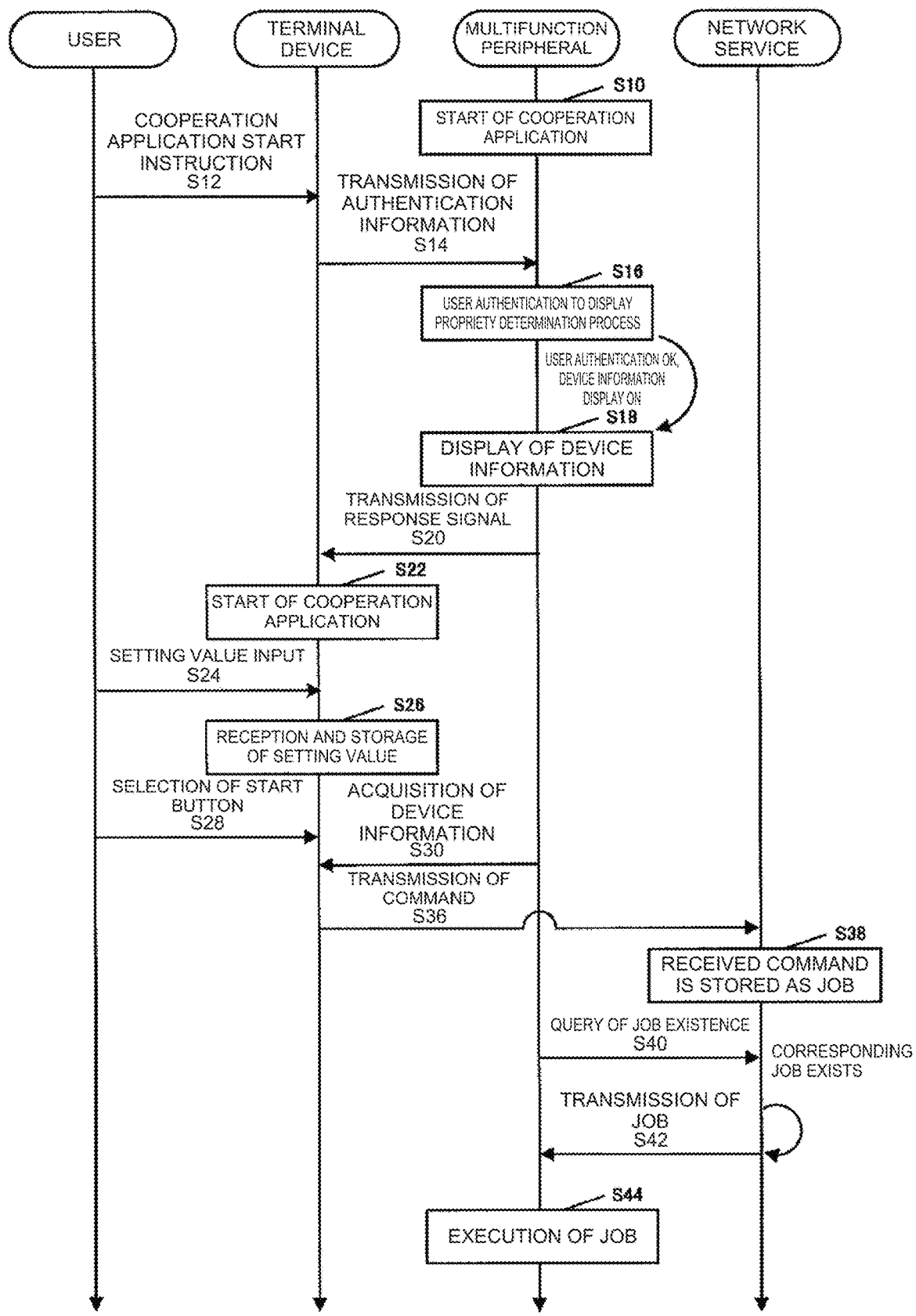
FIG. 30 is a flowchart illustrating an overall process according to the fourth embodiment.

Now, an overall process according to the fourth embodiment will be described with reference to a flowchart in FIG. 30. The overall process described with reference to FIG. 30 can be performed in substantially the same manner as the overall process described in FIG. 6 of the first embodiment, except that the transmission destination of the external command is the network service 50 and the destination of the job acquisition is the network service 50. Therefore, identical step numbers will be given to parts that can be processed in the same manner, and description thereof will be omitted.

In Step S30, when the terminal device 30 acquires device information from the multifunction peripheral 10, the terminal device 30 uses necessary connection information included in the device information to transmit the generated setting information as a command to the network service 50 (Step S36).

The network service 50 stores the received command as a job in the job storage area 595 (Step S38).

The multifunction peripheral 10 performs, for example, HTTPS long polling to the network service 50, and queries whether or not the job of the multifunction peripheral 10 exists (Step S40).

In a case where the job of the multifunction peripheral 10 exists, the network service 50 establishes connection with the multifunction peripheral 10 and transmits the job (Step S42).

The multifunction peripheral 10 executes the received job (Step S44).

The individual processes by the multifunction peripheral 10 and the terminal device 30 can be substantially similar to those in the first embodiment and the like, and will not be described herein.

4.2.2 Process of Network Service 50

Figure 31:
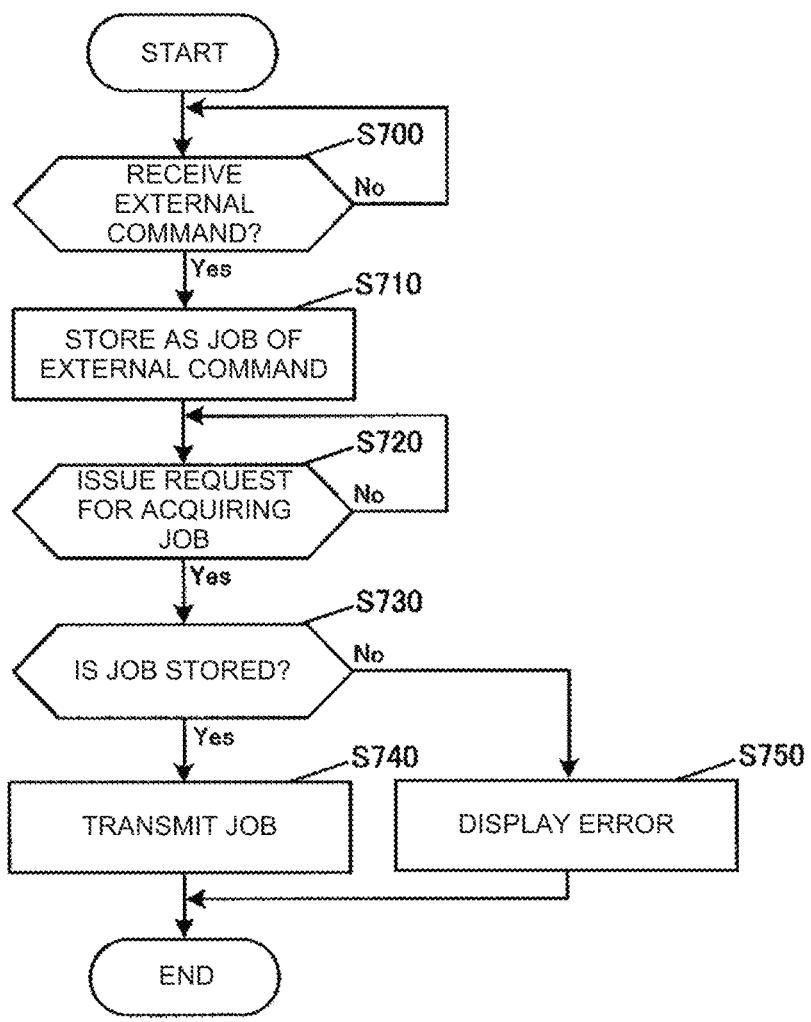
FIG. 31 is a flowchart illustrating a process of the network service according to the fourth embodiment.

Now, a process of the network service 50 will be described with reference to FIG. 31. The controller 51 of the network service 50 determines whether or not an external command is received from the terminal device 30 (Step S700).

When it is determined that the external command is received, the controller 51 stores the setting information and the like included in the external command with job ID in a job storage area 997 (Step S700; Yes→Step S710). On the other hand, when it is determined that no external command is received, the controller 51 waits until an external command is received (Step S700; No).

Next, the controller 51 determines whether or not a request for acquiring a job by HTTPS long polling is received from the multifunction peripheral 10, for example (Step S720).

When it is determined that the request for acquiring a job is received, the controller 51 determines whether or not a job corresponding to the multifunction peripheral 10 which receives the acquisition request is stored (Step S720; Yes→Step S730). On the other hand, when it is determined that the request for acquiring a job is not received, the controller 51 waits until the request for acquiring a job is received (No in Step S720).

In a case where it is determined that the job corresponding to the multifunction peripheral 10 which receives the acquisition request is stored, the controller 51 transmits the job to the multifunction peripheral 10 (Yes in Step S730→Step S740). On the other hand, in a case where it is determined that the job corresponding to the multifunction peripheral 10 which receives the acquisition request is not stored, the controller 51 performs error display and terminates the process (Step S730; No→Step S750).

As described above, according to the fourth embodiment, in addition to the effects of the first embodiment, the job pertaining to an external command transmitted from the terminal device is managed by the network service, and therefore it is possible to reduce the system resources and the like of the terminal device for remote operation.

The present disclosure is not limited to each embodiment described above, and various modifications can be made. That is, the technical scope of the present disclosure also includes an embodiment acquired by combining technical measures modified as appropriate without departing from the scope of the present disclosure.

Furthermore, although some parts of the above embodiments are described separately for convenience of explanation, it is needless to say that the embodiments may be combined and implemented within a technically possible range.

The programs that operate in each device in the embodiments are programs that control CPUs and the like (programs that make computers function) to realize the functions of the embodiments described above.

According to the embodiment, it is assumed that the device simultaneously executes a plurality of programs as needed by a multitask process. The information handled by these devices is temporarily stored in a temporary storage device (for example, a RAM) at the time of the process, and then stored in various storage devices such as a ROM and an HDD to be read, corrected, and written by the CPU as needed.

Herein, as the recording medium for storing the program, a semiconductor medium (e.g., a ROM or a non-volatile memory card), an optical recording medium/magneto-optical recording medium (e.g., a digital versatile disc (DVD), a magneto optical disc (MO), a mini disc (MD), a compact disc (CD), or a Blu-ray (BD) (registered trademark) disc, a magnetic recording medium (e.g., a magnetic tape or a flexible disc) or the like may be used. The functions of the present disclosure may also be realized not only by executing the loaded programs, but also processing in cooperation with the operating system, other application programs, or the like in accordance with the instructions of the programs.

Furthermore, when the program is to be distributed to the market, the program may be stored in a portable recording medium for distribution or transferred to a server computer connected via a network such as the Internet. In this case, a storage device of the server computer is also included in the present disclosure.

What is claimed is:

1. An image processing device comprising:
   a controller;
   a device information generator that generates device information including identification information of a device;
   an authenticator that displays an icon assigned to each user, accepts an operation of the icon by the user, and allows the user to use the image processing device; and
   a display, wherein
   the controller displays, after authentication by the authenticator, the device information on the display, and executes a copy job by controlling a copy job executor based on setting information pertaining to an execution of the copy job transmitted from a terminal device that had read the device information displayed on the display.

2. The image processing apparatus according to claim 1, wherein the controller gives different operation authority to each authenticated user based on user information.

3. An output system comprising:
   a terminal device; and
   an image processing device, wherein the terminal device includes:
a controller;
a device information acquirer that acquires device information including identification information for identifying the image processing device,
the controller generates a user interface that receives operation setting of the image processing device on the basis of a request by a user, and transmits, as a command, the operation setting received via the user interface,
the image processing device includes:
a controller;
a device information generator that generates device information including identification information of a device;
an authenticator that displays an icon assigned to each user, accepts an operation of the icon by the user, and allows the user to use the image processing device; and
display, wherein
the controller displays, after authentication by the authenticator, the device information on the display, and executes a copy job by controlling a copy job executor based on the command pertaining to an execution of the copy job transmitted from a terminal device that had read the device information displayed on the display.

4. The output system according to claim 3, wherein the controller of the image processing device gives different operation authority to each authenticated user based on user information.

5. An output method comprising
generating device information including identification information of a device;
displaying an icon assigned to each user, accepting an operation of the icon by the user, and allowing the user to use the image processing device;
displaying, after allowing the user to use the image processing device, the device information on a display; and executing a copy job based on setting information pertaining to an execution of the copy job transmitted from a terminal device that had read the device information displayed on the display.

6. The output method according to claim 5, wherein different operation authority is given to each authenticated user based on user information.

* * * * *